United States Patent
Kessler et al.

(10) Patent No.: US 8,215,776 B2
(45) Date of Patent: Jul. 10, 2012

(54) LINE ILLUMINATION APPARATUS USING LASER ARRAYS

(75) Inventors: David Kessler, Rochester, NY (US); Marek W. Kowarz, Henrietta, NY (US); James G. Phalen, Rochester, NY (US); John A. Agostinelli, Rochester, NY (US); Michael A. Marcus, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 741 days.

(21) Appl. No.: 12/349,567

(22) Filed: Jan. 7, 2009

(65) Prior Publication Data

US 2010/0171931 A1 Jul. 8, 2010

(51) Int. Cl.
*G02B 27/10* (2006.01)
*G03B 21/14* (2006.01)

(52) U.S. Cl. .......................................... 353/31; 359/618
(58) Field of Classification Search .................... 353/30, 353/31, 33; 359/618, 268
See application file for complete search history.

(56) References Cited

U.S. PATENT DOCUMENTS

| | | | |
|---|---|---|---|
| 5,517,359 A | 5/1996 | Gelbart | |
| 5,719,704 A * | 2/1998 | Shiraishi et al. | 359/558 |
| 5,954,424 A * | 9/1999 | Anderson et al. | 362/242 |
| 5,982,553 A | 11/1999 | Bloom et al. | |
| 6,100,961 A * | 8/2000 | Shiraishi et al. | 355/67 |
| 6,102,552 A | 8/2000 | Tullis | |
| 6,137,631 A | 10/2000 | Moulin | |
| 6,215,579 B1 | 4/2001 | Bloom | |
| 6,307,663 B1 | 10/2001 | Kowarz | |
| 6,392,740 B1 * | 5/2002 | Shiraishi et al. | 355/53 |
| 6,411,425 B1 | 6/2002 | Kowarz et al. | |
| 6,476,848 B2 | 11/2002 | Kowarz et al. | |
| 6,663,788 B2 | 12/2003 | Kowarz et al. | |
| 6,802,613 B2 | 10/2004 | Agostinelli et al. | |
| 6,809,873 B2 * | 10/2004 | Cobb | 359/634 |
| 7,040,760 B2 * | 5/2006 | Nakanishi et al. | 353/20 |
| 7,070,281 B2 * | 7/2006 | Kato | 353/20 |
| 7,296,897 B2 | 11/2007 | Mooradian et al. | |
| 7,672,550 B2 * | 3/2010 | Murase et al. | 385/31 |
| 2004/0109329 A1 * | 6/2004 | Kato | 362/555 |
| 2008/0079921 A1 * | 4/2008 | Oshida et al. | 355/55 |
| 2008/0259285 A1 * | 10/2008 | Sawai | 353/31 |
| 2009/0052203 A1 * | 2/2009 | Murase et al. | 362/553 |
| 2009/0219491 A1 * | 9/2009 | Williams et al. | 353/37 |
| 2009/0231724 A1 * | 9/2009 | Webb | 359/663 |
| 2010/0171931 A1 * | 7/2010 | Kessler et al. | 353/31 |

* cited by examiner

*Primary Examiner* — John Lee
(74) *Attorney, Agent, or Firm* — Nelson Adrian Blish

(57) ABSTRACT

An illumination apparatus forms, onto a linear array light modulator, a line of illumination that extends in a linear direction. The illumination apparatus has a first laser array with laser emitters for forming a first linear beam array and a second laser array with laser emitters for forming a second linear beam array. An array combiner aligns at least the first and second linear beam arrays in the linear direction and directs the first and second linear beam arrays along a propagation path to form a mixed illumination. At least first and second cylindrical lens elements having power in the linear direction relay the mixed illumination from the propagation path toward the linear array light modulator. At least third and fourth cylindrical lens elements having power in the cross-array direction that is orthogonal to the linear direction focus the mixed illumination onto the linear array light modulator.

16 Claims, 18 Drawing Sheets

LINE ILLUMINATION APPARATUS USING LASER ARRAYS

FIELD OF THE INVENTION

This invention generally relates to illumination apparatus and more particularly to an apparatus for providing a line of light from two or more laser arrays.

BACKGROUND OF THE INVENTION

Laser arrays show particular promise as illumination sources in imaging applications where brightness, high efficiency, and long component life are needed. As the cost of solid-state laser sources continues to drop and the available spectral range expands, solid-state laser arrays have been proposed as possible sources for digital projection and display apparatus, providing advantages over other types of light sources.

There are a number of applications for which a thin line of intense light is of particular interest. A number of spatial light modulators operate upon a single line of illumination and scan this line over a display surface for forming a two-dimensional image, for example. A general class of this type uses a linear array of micro-electromechanical modulators. Linear spatial light modulators of this type form images by a rapid, repeated sequence in which each single line of the image is separately formed and is directed to a screen or other display surface by reflection, or by other type of redirection, from a scanning element, such as a rotating mirror. Types of linear array light modulators that operate in this manner include devices such as grating light valve (GLV) designs, offered by Silicon Light Machines and described in U.S. Pat. No. 6,215,579 (Bloom et al.) and elsewhere. Display systems based on GLV devices are disclosed, for example, in U.S. Pat. No. 5,982,553 (Bloom et al.).

An improved type of linear array light modulator is the grating electromechanical system (GEMS) device, as disclosed in commonly-assigned U.S. Pat. No. 6,307,663 (Kowarz) and elsewhere. Display systems based on a linear array of conformal GEMS devices are described in commonly-assigned U.S. Pat. Nos. 6,411,425 and 6,476,848 (both by Kowarz et al.). Further detailed description of GEMS device architecture and operation is given in a number of commonly-assigned U.S. patents and published applications, including U.S. Pat. No. 6,663,788 (Kowarz et al.); and U.S. Pat. No. 6,802,613 (Agostinelli et al.). In GEMS devices, light is modulated by diffraction. On a GEMS chip, the linear array of conformal electromechanical ribbon elements, formed on a single substrate, provides one or more diffracted orders of light to form each line of pixels for line-scanned projection display.

GLV and GEMS color display system architectures generally employ three separate color paths, red, green, and blue (RGB), each color path provided with a linear array of electromechanical grating devices. Each linear array of electromechanical grating devices, when actuated, modulates its component red, green, or blue laser light to form a single line of the image at a time. The resulting modulated lines of light for each color are then combined onto the same output axis to provide a full-color image that is then scanned to the display screen.

In order to provide the best possible image quality when using linear spatial light modulators of this type, it is useful to provide a linear illumination that has these characteristics:

(i) Constrained spatial line width in the cross-array direction, with respect to a modulator for example. For GEMS devices, the linear illumination is a line of light (typically in the range of about 16 mm long) that is preferably no wider than about 100 µm. GLV devices require an even thinner spatial line width in the range of about 20 µm.

(ii) Uniformity. For intensity over the fill length of the line of illumination that is provided, the line of illumination should be as uniform in intensity along the line as possible, without abrupt changes within that range.

(iii) Single-mode light in the width direction of the line of illumination. This characteristic relates to the requirements for diffractive order separation for GEMS light modulators. Single-mode operation provides modulated light having improved contrast.

(iv) Reduced speckle. Where possible, some amount of speckle reduction in the source illumination is advantageous. Arrays of uncorrelated emitters are advantaged for helping to reduce speckle effects when their light is combined.

(v) Telecentricity. Telecentric light is advantageous for electronic imaging applications in general. Where GEMS modulators are used, telecentricity is particularly advantaged, since it allows filtering of cross-order diffracted light in the array direction for improved contrast. Telecentricity of better than 4 mr (milliradians) in the array direction is needed.

(vi) Power. It is recognized that there are advantages to illumination solutions that can combine the light from two or more laser arrays to achieve higher power levels while maintaining good performance with respect to characteristics (i)-(v) noted above. A Gaussian distribution of intensity in the cross-array (width) direction is particularly desirable for GEMS modulation. This means preserving, as closely as possible, the original power distribution profile of the light that is emitted from the laser array itself This is a difficult task, made more arduous as the light is processed by each successive optical component.

Although conventional solutions have achieved some measure of acceptable performance for providing linear illumination, there is room for improvement with respect to each of characteristics (i) through (vi) just listed. Conventional solutions for providing linear illumination for GEMS devices have not taken advantage of laser arrays, but have employed single-mode, single-beam lasers for this purpose, with disappointing results. For example, maintaining the desired uniformity (ii) for a line of illumination of sufficient length proves to be a challenge when using single-beam lasers. Providing single-mode illumination (iii) is a challenge that is generally not recognized as a requirement with existing illumination systems. Speckle reduction (iv) is most advantageously addressed if speckle is corrected, at least somewhat, in the source illumination; it can be difficult to provide both single-mode illumination (iii) and reduced speckle (iv) at the same time. A disadvantage of single-beam lasers relates to power scaling; an incremental increase in output power can be disproportionately high in cost.

Laser arrays have been proposed for illumination with various types of two-dimensional spatial light modulators, such as micromirror-based devices, as described, for example, in U.S. Pat. No. 7,296,897 (Mooradian et al.). However, with this type of solution, the laser light from the array of sources is not provided as a thin line of light, but must be spread over a broad area, uniformly diffused over the full surface of the two-dimensional micromirror-based array.

The problem of providing a line of laser light that meets a portion of the basic requirements of at least characteristics (ii)

and (v) given earlier was addressed for laser printhead applications using infrared light in commonly-assigned U.S. Pat. No. 6,137,631 (Moulin). In the Moulin '631 illumination system solution, a single laser array is used as the light source. An integrating element helps to uniformize light from multiple lasers in the array, which is then directed to a spatial light modulator, through a series of cylindrical lenses, and is focused by a printhead. Although this type of solution provides a line of light from a laser array, the characteristics of the light provided are not suitable for use with GEMS or GLV light modulators in display applications. For example, the Moulin '631 solution is unable to meet the constrained line width limits described earlier in (i) and, instead, provides as output spatial line widths that exceed those acceptable for GEMS and GLV devices. This solution is not suitable for highly coherent lasers. Further, no attempt is made to address speckle (iv). The Moulin '631 solution is constrained in terms of power output capability, limited to the output power that is available from a single laser array. Designed for printhead functions in the infrared spectrum, the Moulin solution would not be usable with GEMS- or GLV-based writers, display projectors, or other apparatus for example.

Earlier attempts to utilize laser arrays to provide some measure of uniformity fall short of achieving all of conditions (i)-(vi) noted above. As one example, U.S. Pat. No. 6,102,552 (Tullis) describes the use of an array of multiple lasers to direct uniform illumination toward a target, but does not form a line constrained in the cross-array direction as in (i) above and does not address single-mode illumination, speckle, telecentricity, or power distribution in a cross array direction as in (iii)-(vi) above. As another example, U.S. Pat. No. 5,517,359 (Gelbart) provides an optical arrangement using a lenslet array that superimposes light from each laser diode in an array in order to form a uniform line of illumination. However, the solution of the Gelbart '359 disclosure does not satisfy the line width requirements given in (i) above, nor address the need for single-mode light in the cross-array direction, reduced speckle, telecentricity of light, or the need for increased power using multiple arrays while preserving a suitable power distribution profile as in (iii)-(vi) above.

Thus, it is seen that there is a need for an apparatus that provides a uniform, thin line of light having single-mode characteristics in the cross-array direction and suitable power characteristics for display illumination and other applications.

SUMMARY OF THE INVENTION

It is an object of the present invention to address the need for an improved illumination apparatus for providing a uniform line of laser light. With this object in mind, the present invention provides an illumination apparatus for forming, onto a linear array light modulator, a line of illumination that extends in a linear direction, the illumination apparatus comprising:

a) a first laser array comprising a plurality of laser emitters for forming a first linear beam array and, spaced apart from the first laser array, a second laser array comprising a plurality of laser emitters for forming a second linear beam array;

b) an array combiner disposed to align at least the first linear beam array and the second linear beam array in the linear direction and to direct the first and second linear beam arrays along a propagation path to form a mixed illumination;

c) at least first and second cylindrical lens elements having power in the linear direction and disposed to relay the mixed illumination from the propagation path toward the linear array light modulator; and d) at least third and fourth cylindrical lens elements having power in the cross-array direction that is orthogonal to the linear direction and disposed to focus the mixed illumination onto the linear array light modulator.

Embodiments of the present invention provide a single, focused line of substantially telecentric illumination from a laser array emitter having two separate arrays.

It is an advantage of the present invention that it provides a thin linear illumination that exhibits single-mode characteristics in the width dimension. It is a further advantage of the present invention that it provides a way to combine laser array sources with reduced speckle. Unlike earlier illumination approaches using laser arrays, the apparatus and methods of the present invention can compensate for or eliminate visible coherence artifacts and speckle that result from correlation of corresponding forward- and backward-propagating elements of laser arrays in various configurations.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art. Figures shown and described herein are provided in order to illustrate key principles of operation of the present invention and are not drawn with intent to show actual size or scale. Some exaggeration may be necessary in order to emphasize relative spatial relationships or principles of operation.

In the context of the present disclosure, the term "cross-array" is equivalent to the width direction of the line of illumination that is generated by the apparatus of the present invention. The term "cross array" is descriptive of the use of the illumination apparatus of the present invention when it directs a line of illumination onto a linear array light modulator, such as a GEMS device, one of its possible uses. The phrase "linear direction" is used for the direction in which the line of illumination extends; the linear direction is orthogonal to the cross-array direction.

A cylindrical lens element has power in one direction only and has essentially zero power in the orthogonal direction.

Laser arrays of particular interest for projection applications include various types of VCSEL arrays, including vertical extended cavity surface-emitting laser (VECSEL) and Novalux extended cavity surface-emitting laser (NECSEL) devices from Arasor, Sunnyvale, Calif. In addition, embodiments of the present invention can also be used with edge-emitting laser arrays, such as the ML 1467 Laser Array from Modulight, Inc., Tampere, Finland.

Figure 1A:
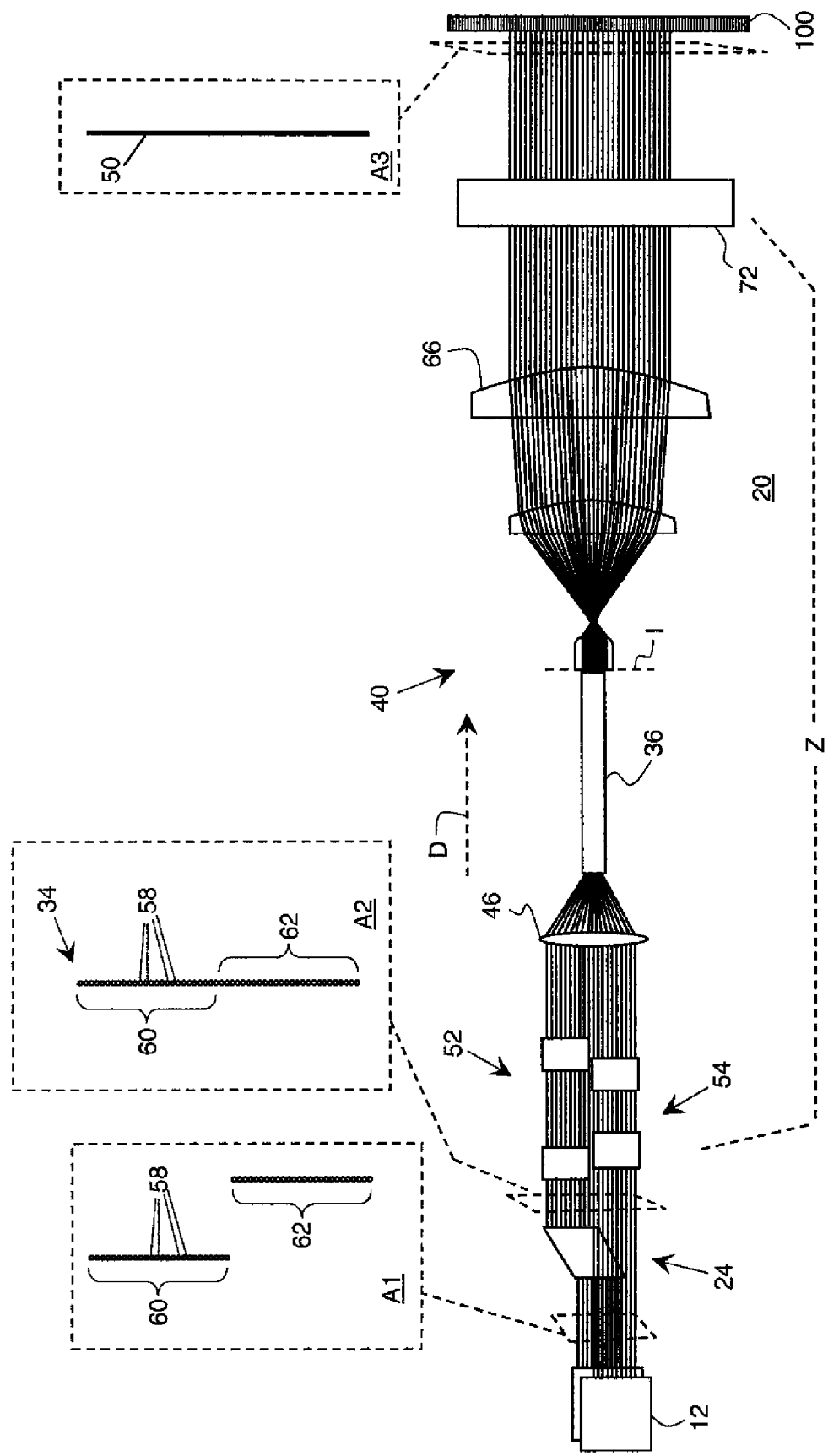
FIG. 1A is a schematic block diagram of an embodiment of the present invention with the array lying in the plane of the page.

Referring to FIG. 1A, there is shown a schematic diagram of an illumination apparatus 20, taken in the plane of the linear beam array, for providing a linear illumination 50 in a plane defined in view A3 according to an embodiment of the present invention. A light source 12 provides laser light in the form of two or more separate linear beam arrays 60 and 62. As shown in view A1 taken orthogonally to the optical path, each linear beam array provides a set of one or more laser beams 58, where multiple beams are arranged along a line. An array combiner 24 aligns the two or more linear beam arrays 60 and 62 to form a single multi-beam line 34, as shown in view A2. The laser light from multi-beam line 34 is directed along a propagation path D that extends through optional optical assemblies 52 and 54 and by a cylindrical condenser 46, through an integrator 36, a propagation path component in this embodiment that forms a uniformized linear beam that has improved uniformity along its length dimension, without affecting single-mode characteristics along its width dimension. An intermediate image I of the combined laser arrays at light source 12 is formed at the output of integrator 36, in the position indicated by a dashed line. This intermediate image is then relayed to a linear array light modulator 100. A doubly telecentric converter 40 expands the uniformized linear beam in length, maintaining a very narrow beam width. An aspheric lens element 66 collimates the expanded uniformized linear beam to provide linear illumination 50. Aspheric lens element 66 is a doublet in one embodiment, consisting of an aspheric lens element and a cylindrical lens element, but may have other configurations, as described in more detail subsequently.

Figure 1B:
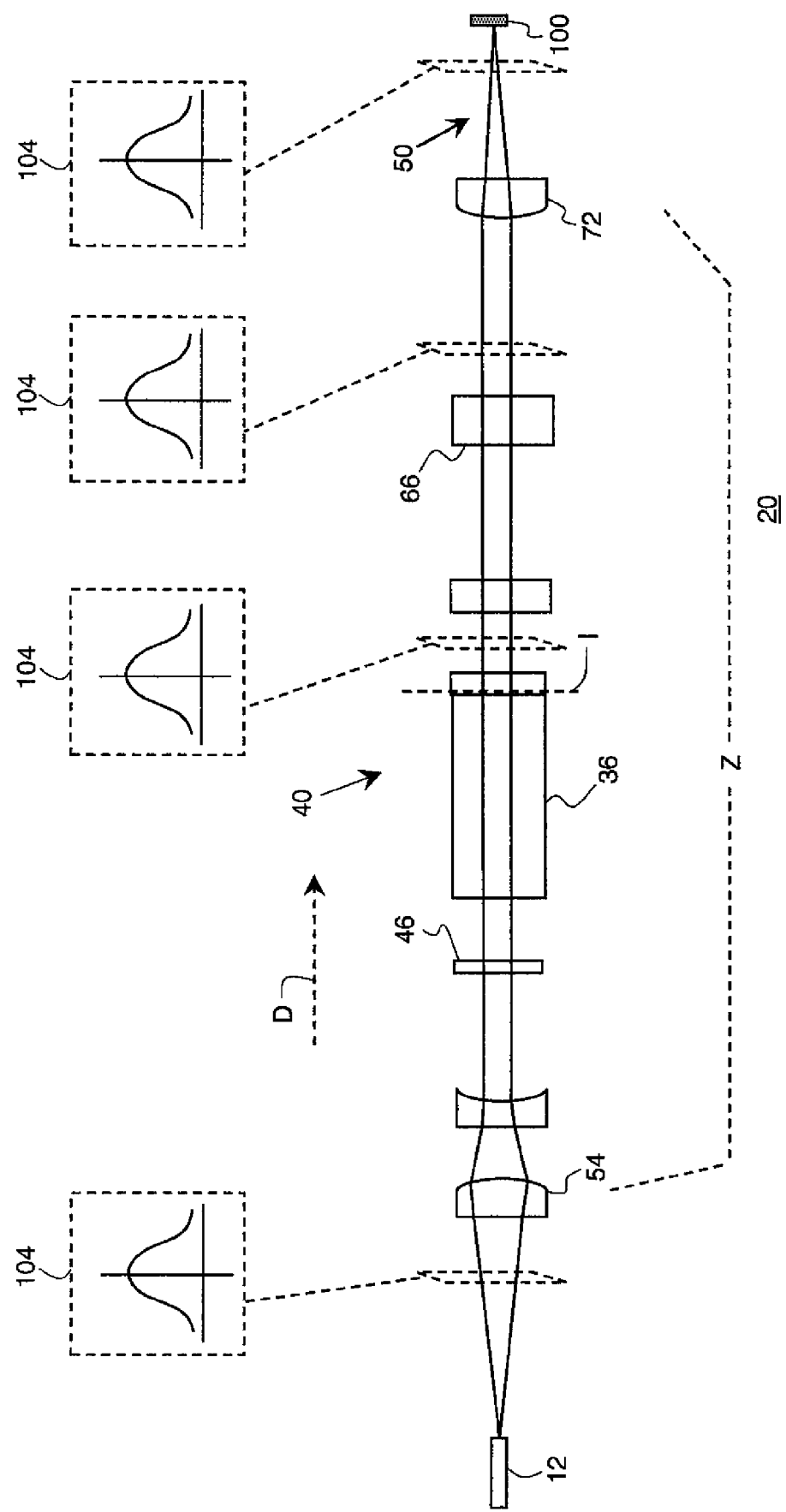
FIG. 1B is a schematic block diagram of an embodiment of the present invention with the array orthogonal to the plane of the page.

In the embodiment of FIGS. 1A and 1B, lens elements 46 and 66 provide power in the linear direction, but not in the cross-array direction. One or more additional cylindrical lens elements 72 are also provided in the path of the collimated light to focus in the cross-array (width) direction. A cylindrical zoom lens apparatus for focus in the cross-array direction, labeled Z in FIGS. 1A and 1B, is formed by cooperation between adjustable optical assemblies 52 or 54 in each of the respective linear beam arrays and fixed position cylindrical lens element 72, as described in more detail subsequently.

The component arrangement shown in FIGS. 1A and 1B provides, as linear illumination 50, a light beam that is a spatially narrow line of light, single-mode in the width or cross-array direction and multi-mode along the length direction. Embodiments of the present invention provide good uniformity along the length direction and, in the cross-array direction, maintain the relatively narrow beam width and single mode operation of the originating lasers that are part of light source 12. Advantageously, the embodiment of FIGS. 1A and 1B is doubly telecentric. In the embodiment shown in FIGS. 1A and 1B, linear illumination 50 is directed to linear array light modulator 100, such as a GEMS device.

The schematic diagram of FIG. 1B is taken orthogonally with respect to the view of FIG. 1A, with the line of light from the linear beam arrays orthogonal to the plane of the page. An intensity profile distribution graph 104 for light in the cross-array direction is shown at a number of positions along the optical path. As FIG. 1B shows, a substantially Gaussian intensity profile, obtained initially in the light emitted from the laser light source 12, is preserved, in the cross-array direction, throughout the optical path, so that the linear illumination 50 output also has a substantially Gaussian intensity profile. This is substantially equivalent to maintaining single-mode operation in the width, or cross-array, direction. The phrase "substantially Gaussian in shape" refers to a shape that corresponds predominantly to the shape of a Gaussian probability distribution curve exhibiting a generally exponential decay from a peak value. However, a shape that is "substantially Gaussian" may exhibit some characteristics of a non-Gaussian curve as well; for example, the curve may also include a component described by a polynomial.

Figure 2:
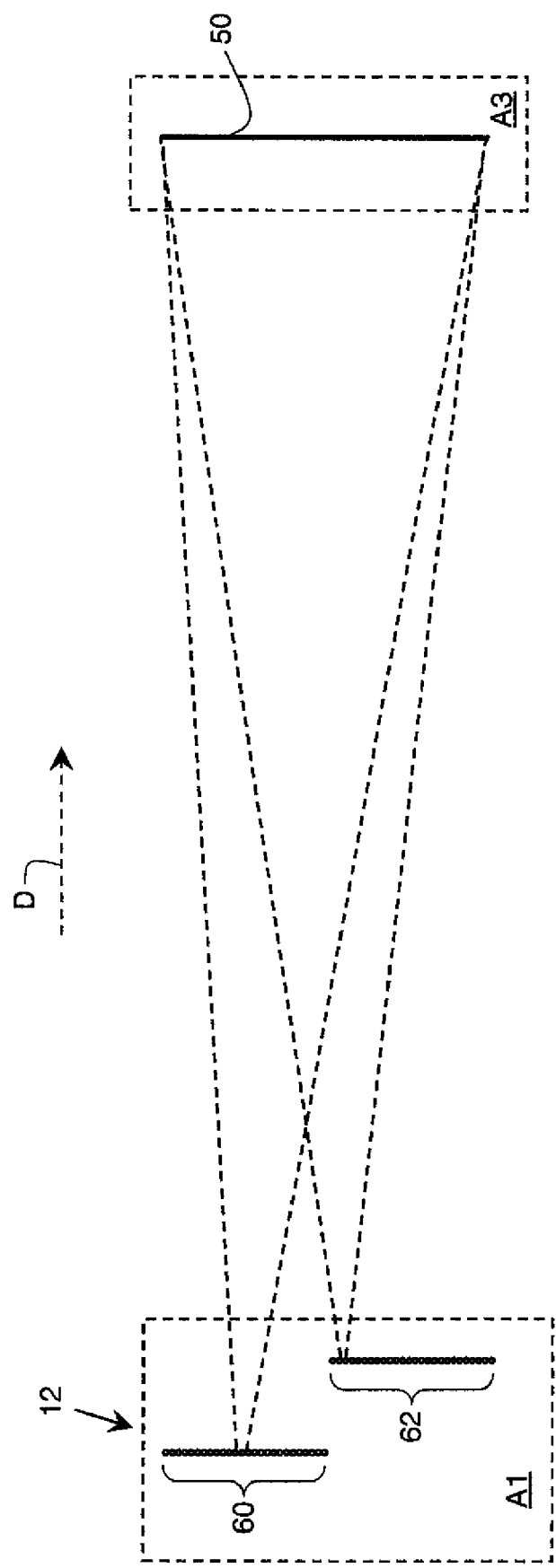
FIG. 2 is a schematic diagram showing how light is spread for each individual laser source using embodiments of the present invention.

The schematic diagram of FIG. 2 shows how the light from each laser within light source 12 is distributed over the lengthwise extent of linear illumination 50 using the embodiment of FIGS. 1A and 1B. Notably, each individual laser beam 58 from each linear beam array 60 and 62 is expanded by the system optics so that it fills the fall length of the line of illumination. At the same time, in the orthogonal direction, the narrow single-mode character of each laser beam 58 is maintained, as was described earlier with particular reference to FIG. 1B. This same relationship applies for any arrangement of linear beam arrays 60 and 62, whether each beam array has one, two, or more laser light sources. It can be appreciated that this expansion of the beam in only one of two orthogonal directions provides a high level of uniformity. In addition, because light from each individual source can be spread across the full line of illumination, speckle is dramatically reduced. This also helps to reduce other coherence artifacts such as interference fringes due, for example, to stray reflections.

A further benefit is obtained relative to usable component lifetime where there are multiple laser sources that contribute to form each linear beam array 60 and 62. Where one or more individual laser sources may fail, the resulting loss of light is not localized at one portion of the line of illumination, causing non-uniformity, but is spread across the line. Thus, in a specific example, where each linear beam array 60 and 62 has twenty laser sources, the failure of a single laser source is not catastrophic, but simply reduces the light output by 2.5% uniformly over the full line of linear illumination 50.

Light Source 12

Figure 3B:
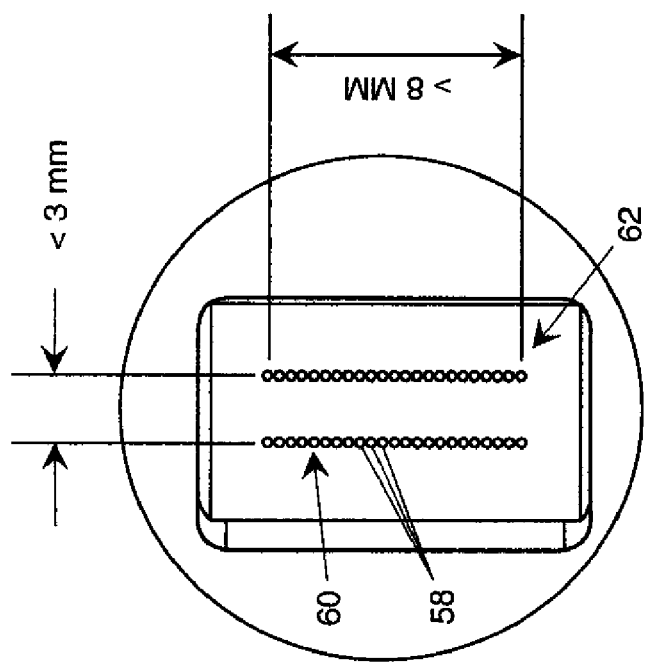
FIG. 3B is a plan view showing the two sets of laser beams provided by the laser array of FIG. 3A.
Figure 3A:
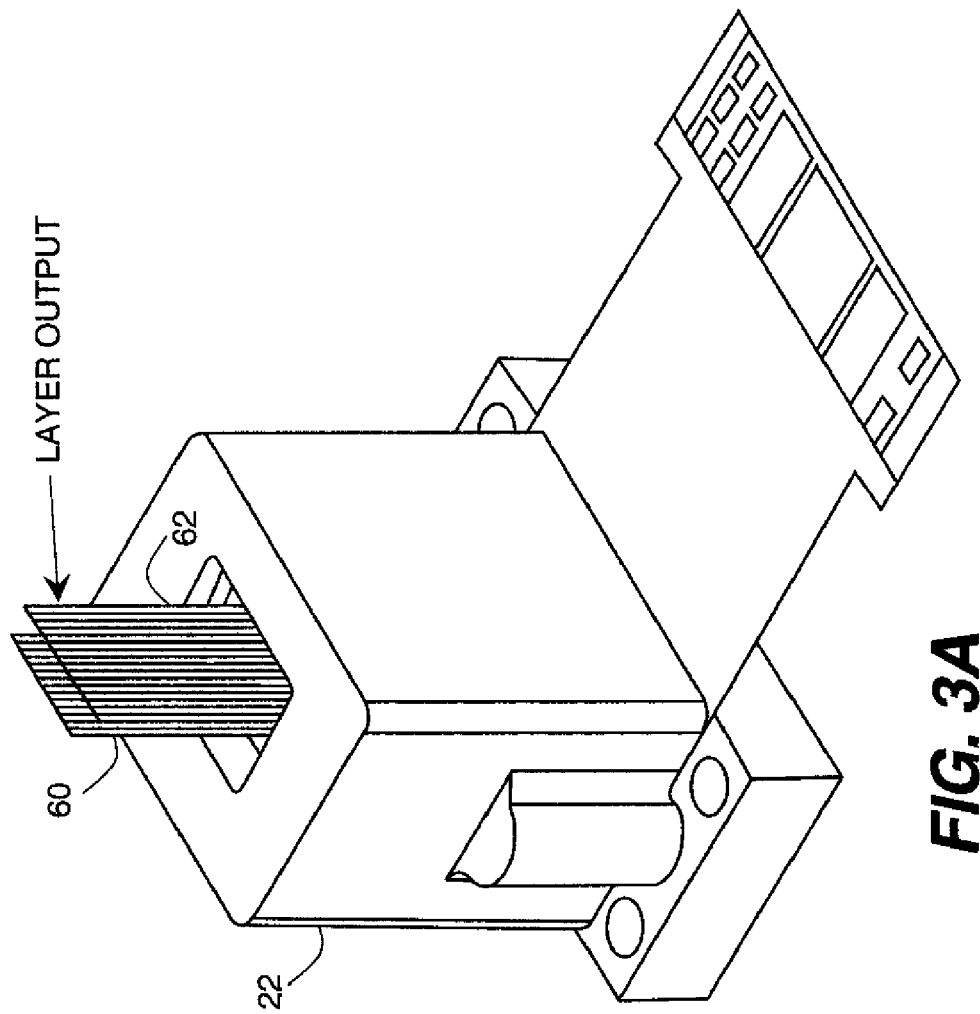
FIG. 3A is a perspective view of a laser array for providing two sets of laser beams in parallel alignment.

As was described earlier with reference to FIG. 1A, light source 12 comprises two or more laser light emitters, arranged in arrays and forming linear beam arrays 60 and 62. The two or more laser light emitters may be packaged in the same component, employing a common substrate but providing two arrays spaced apart from each other, or may be packaged as separate components. An array could also be assembled using multiple individual lasers, such as using a bank of semiconductor lasers arranged in a line, for example. FIG. 3A shows a perspective view of a laser array 22 that serves as light source 12 in one embodiment. FIG. 3B shows a plan view of the laser output, taken along the light path. From a single component, two linear beam arrays 60 and 62 are emitted, each beam array having individual beams 58 that originate from a line of emitters. This dual-beam array arrangement is typical of a number of laser emitters, such as the NECSEL™ Visible Array provided by Arasor International Ltd., Mountain View, Calif. In this dual-beam array arrangement, each emitter in the first beam array has a corresponding emitter in the second array that is obtained from the same laser emitter cavity. This makes pairs of emitters, one from the first and the other from the second array, mutually coherent. One emitter in this matched pair is in the forward-directed array, the other emitter is in the backward-directed array that must be turned 180 degrees by components in the embodiment shown in FIGS. 1A and 1B.

Figure 3C:
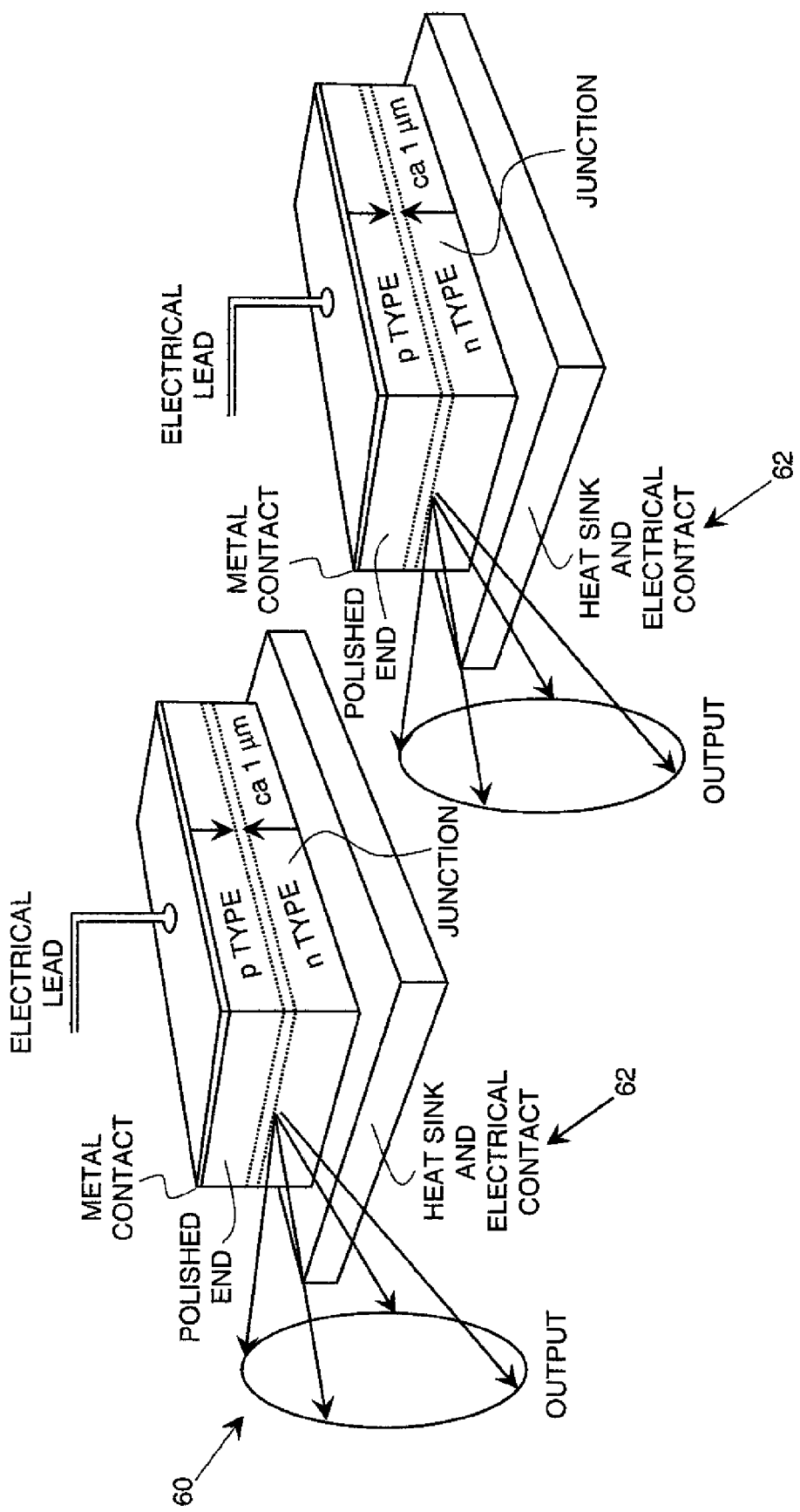
FIG. 3C is a perspective view of two edge-emitting laser devices in an alternate embodiment of the present invention.

FIG. 3C shows another embodiment of light source 12 in which linear beam arrays 60 and 62 are from separate edge-emitting laser arrays, such as those noted earlier. Because these devices tend to provide a highly divergent laser light output, one or more optional cylindrical lenses (not shown in FIG. 3C), such as a rod lens or fiber lens, are typically provided within 100 μm of the emitting surface in order to improve collimation, along with other supporting optics, such as lenslet arrays from LIMO GmbH, Dortmund, Germany. The use of rod lenses and the like for collimating light near the source of an edge-emitting laser array is well known to those skilled in the optical arts.

As noted earlier, one or more of linear beam arrays 60 or 62 could provide as few as one laser source, or any larger number of laser sources. One advantage of multiple sources relates to redundancy in the event that an individual source fails, as was described with reference to FIG. 2.

Array Combiner 24

Referring back to FIGS. 1A and 1B, view A2 shows the overall function of array combiner 24 for forming single multi-beam line 34 by aligning at least two linear beam arrays 60 and 62 along a common line, then directing the aligned beam arrays along propagation path D. In various embodiments of the present invention array combiner 24 may operate by stacking the two linear beam arrays 60 and 62 as shown in A2 or may use some other alignment method, such as overlapping or interleaving, for example. In some embodiments, there may be a slight gap between linear beam arrays 60 and 62, depending on where these beam arrays are viewed.

Figure 4A:
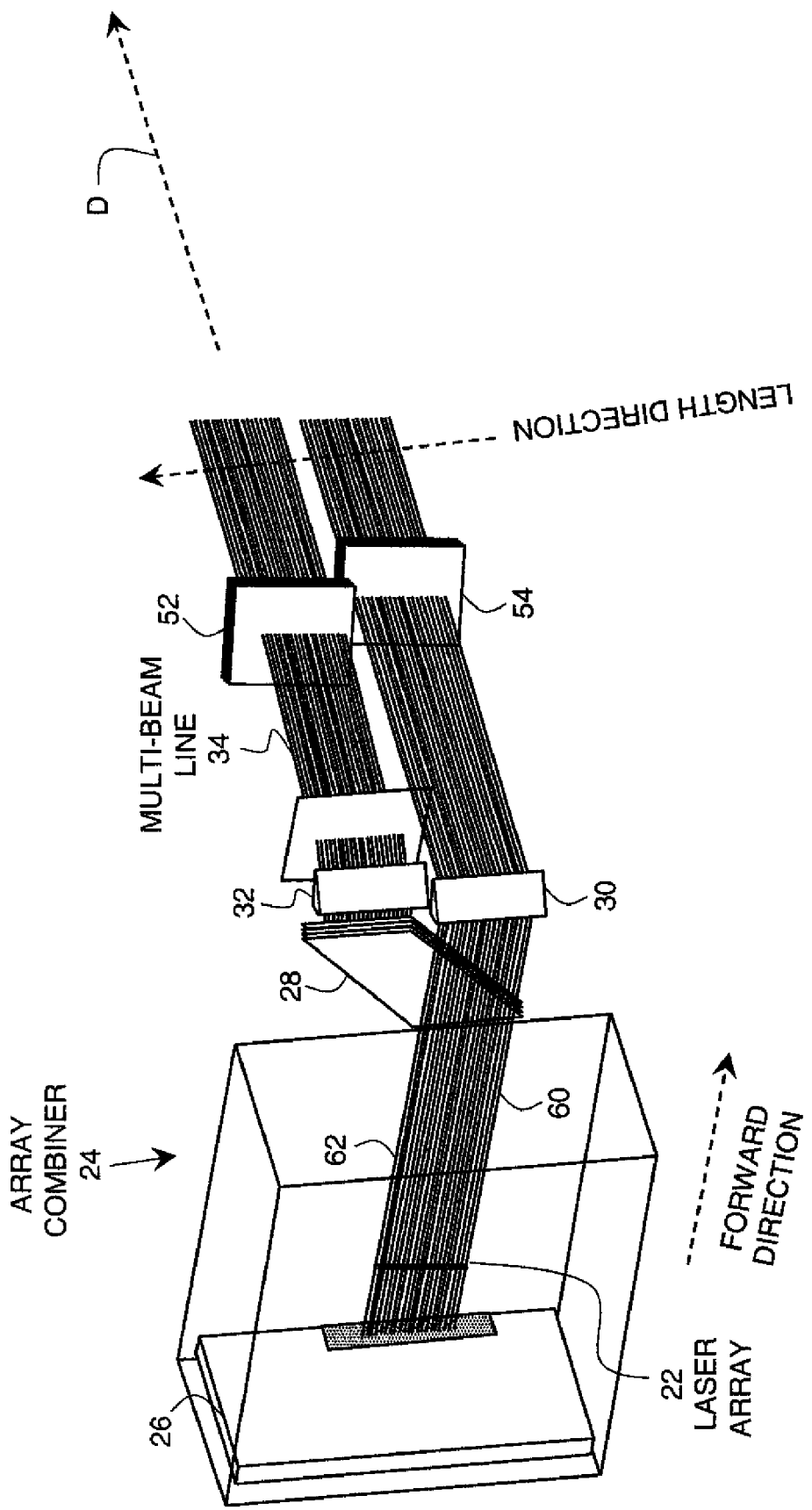
FIG. 4A is a perspective view that shows the function of an array combiner in one embodiment using a laser array.

The perspective view of FIG. 4A shows an embodiment of array combiner 24 that works with laser array 22 of FIGS. 3A and 3B in order to provide the stacked arrangement shown in A2 of FIG. 1A. Within laser array 22 itself a reflective element 26 redirects linear beam array 62, turning it 180 degrees so that it is directed in the same forward direction as linear beam array 60. This provides a different optical path length for light from the two different linear beam arrays 60 and 62, which is corrected by zoom components further down in the optical path, as described in more detail subsequently. A prism, acting as an "elevator prism" forms a light guide 28 for redirecting linear beam array 62, vertically repositioning linear beam array 62 to align it with linear beam array 60 in the length direction. Reflective elements 30 and 32 redirect light from linear beam arrays 60 and 62 respectively into propagation path D as multi-beam line 34. Referring back to view A2 in FIG. 1, multi-beam line 34 may have a gap (not shown) between the portions that originate at separate linear beam arrays 60 and 62 respectively. Optical assemblies 52 and 54, each positionable at appropriate locations along the optical path for light from the component linear beam arrays 60 and 62 form part of a one-dimensional zoom lens arrangement, as described subsequently. The embodiment of FIG. 4A is advantaged for increasing the path length difference between pairs of mutually coherent laser emitters.

Figure 4B:
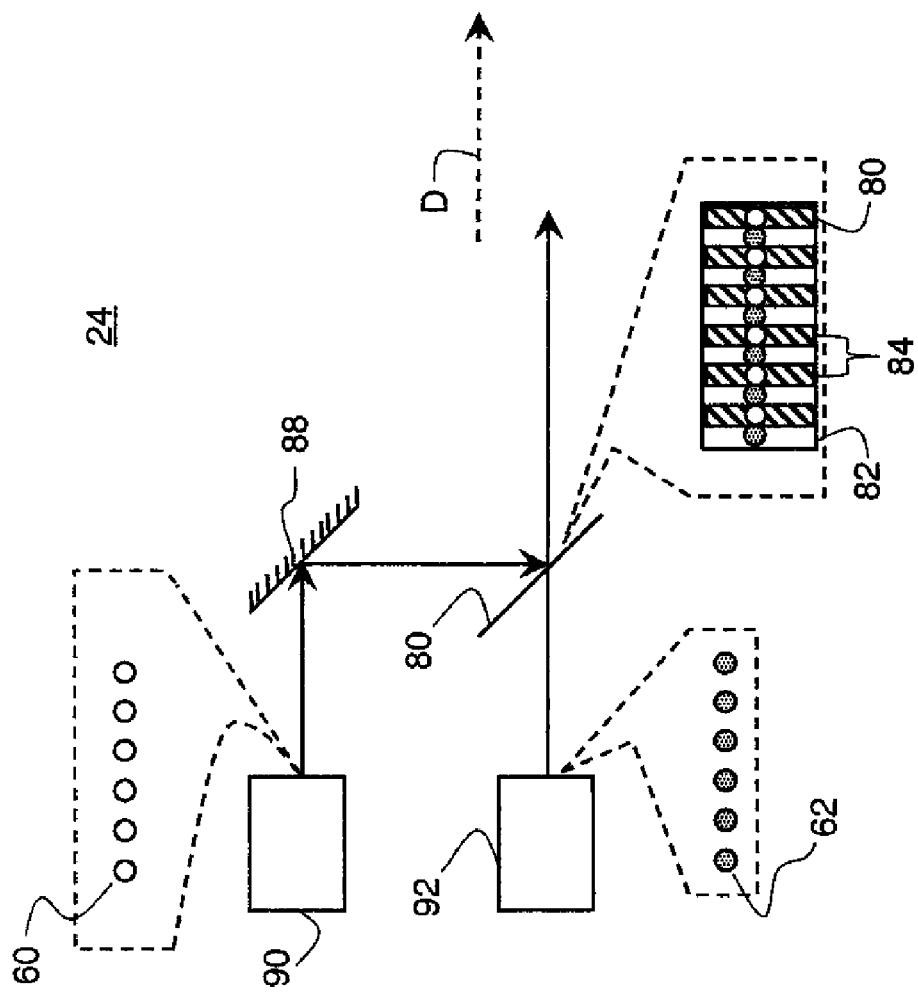
FIG. 4B is a schematic view showing the use of a patterned mirror for interleaving beam arrays.

The schematic diagram of FIG. 4B shows an alternate embodiment of array combiner 24 that provides an interleaved light output using a patterned mirror 80. A laser array 90 provides linear beam array 60; another laser array 92 provides linear beam array 62. Patterned mirror 80 has alternating reflective segments 84 and transmissive segments 82, spaced appropriately for the respective beam arrays. Each individual beam of linear beam array 62 is directed through patterned mirror 80. Individual beams of linear beam array 60 are reflected from a turning mirror 88 and then reflected once again from reflective segments 84 on patterned mirror 80, thus becoming interleaved with transmitted beams of linear beam array 62 and directed along propagation path D.

Figure 4C:
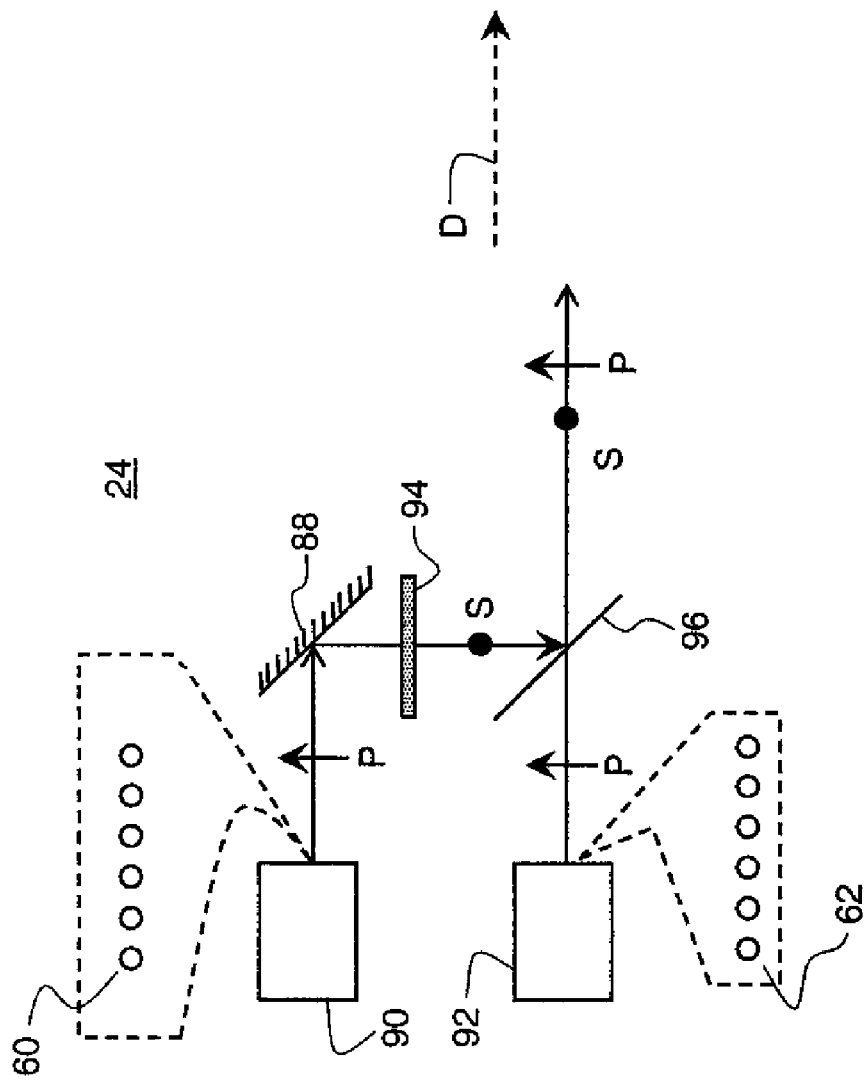
FIG. 4C is a side view showing the use of a polarization beam splitter for interleaving or overlapping beam arrays.

The schematic diagram of FIG. 4C shows an alternate embodiment of array combiner 24 that provides either an interleaved or an overlapped light output by manipulating the polarization of the laser light. Here, the emitted light from both laser arrays 90 and 92 is shown as having P polarization. The light from laser array 90, forming linear beam array 60, is reflected from turning mirror 88 and directed through a retarder 94, a half-wave plate that rotates polarization to provide S-polarized light. A polarization beam splitter 96 transmits the P-polarized light of linear beam array 62 and reflects the S-polarized light from linear beam array 60 onto the same optical propagation path. Advantageously for this type of array combining, both edge-emitting and VECSEL laser emitters are highly polarized, making this arrangement practical in terms of light efficiency. However, downstream components in the optical path may or may not operate optimally with light of mixed polarization.

A number of different array combiner 24 embodiments provide different optical path lengths for the linear beam arrays. This can be advantageously utilized in order to reduce speckle effects, such as by delaying a portion of the light relative to its coherence length. This can be advantageous when using dual linear laser arrays, such as the NECSEL devices described earlier. Lenses in optical assembly 52 or 54 can include an additional element for increasing the optical path delay, such as an optical flat or air delay path, for example. This would then serve to delay, by a distance longer than the coherence length of the lasers, the light from one or the other arrays. This provides an extra factor of speckle reduction by the square root of 2. Light guide 28, in the embodiment of FIG. 4A, can be advantageous for improving speckle reduction.

Integrator 36

Referring back to FIGS. 1A and 1B, integrator 36 is designed to provide light propagation path D with mode-mixing in the length direction while preserving single-mode light in the width direction. A suitable integrator for providing this mixed illumination would be a plane-parallel glass plate or similar component, for example. A lenslet array or other type of integrating device could alternately be used for integrator 36.

Doubly Telecentric Converter

Figure 5:
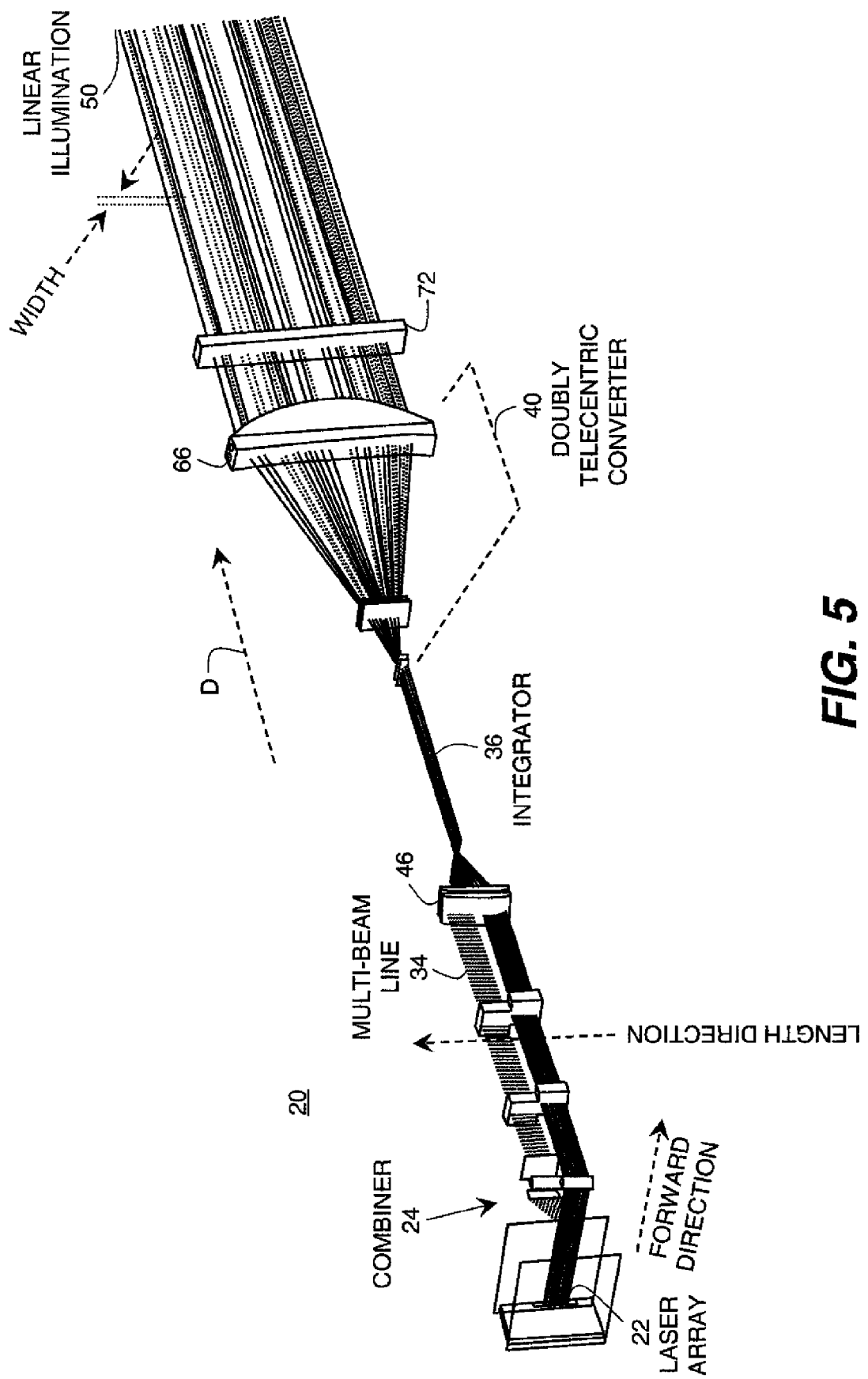
FIG. 5 is a perspective view of an illumination apparatus according to one embodiment of the present invention.

The perspective view of FIG. 5 shows components of illumination apparatus 20 using VECSEL laser array 22. The function of doubly telecentric converter 40 is to expand the output beam provided from propagation path D in the length direction only and to maintain the narrow spatial width of linear illumination 50. For the embodiment of FIG. 5, this magnifies the image at the output facet of integrator 36 to the plane of illumination at the intended device (such as a GEMS modulator) while providing uniform light along the length direction of the line of illumination. Telecentricity is provided at the input and output by virtue of the a focal design of the converter.

Figure 6:
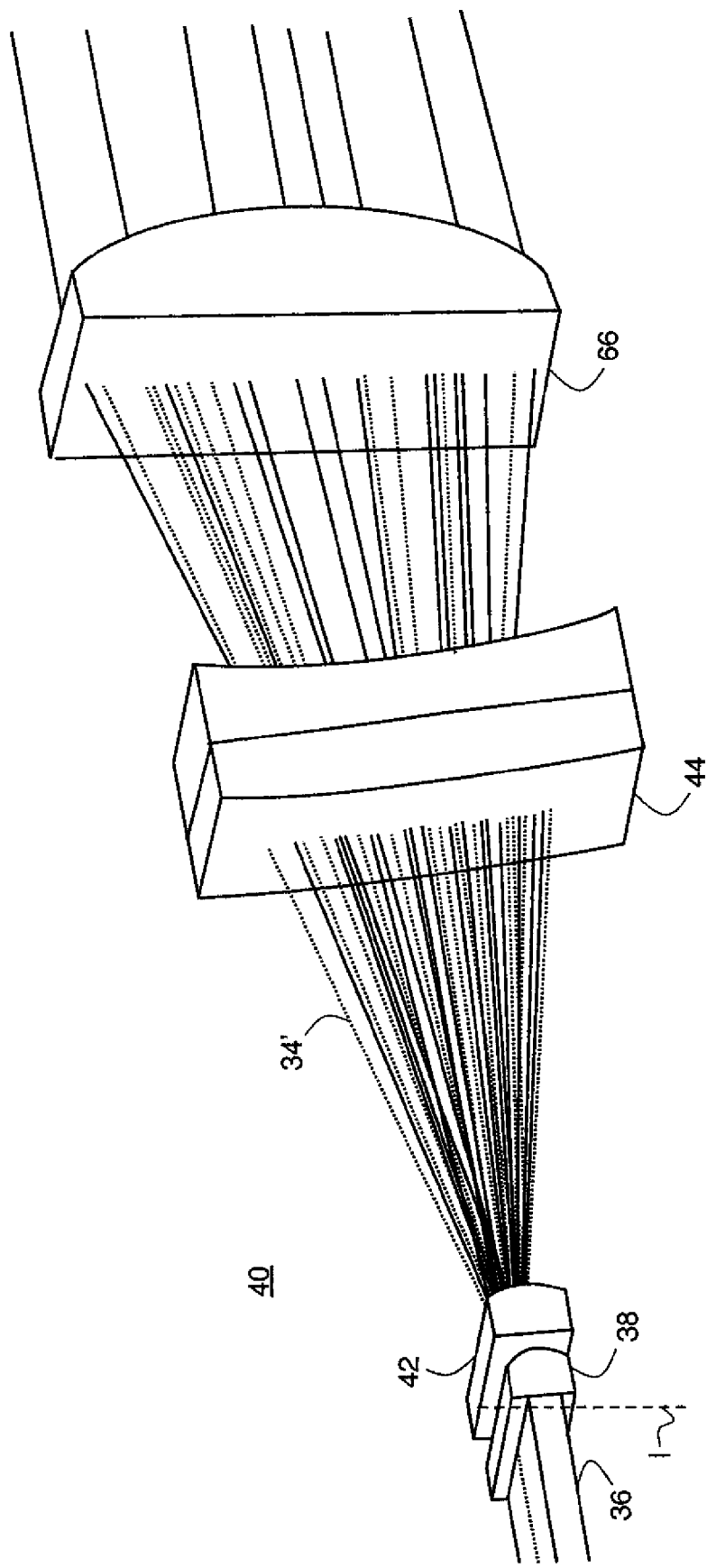
FIG. 6 is a perspective view showing a close up of the doubly telecentric converter of the present invention.
Figure 7:
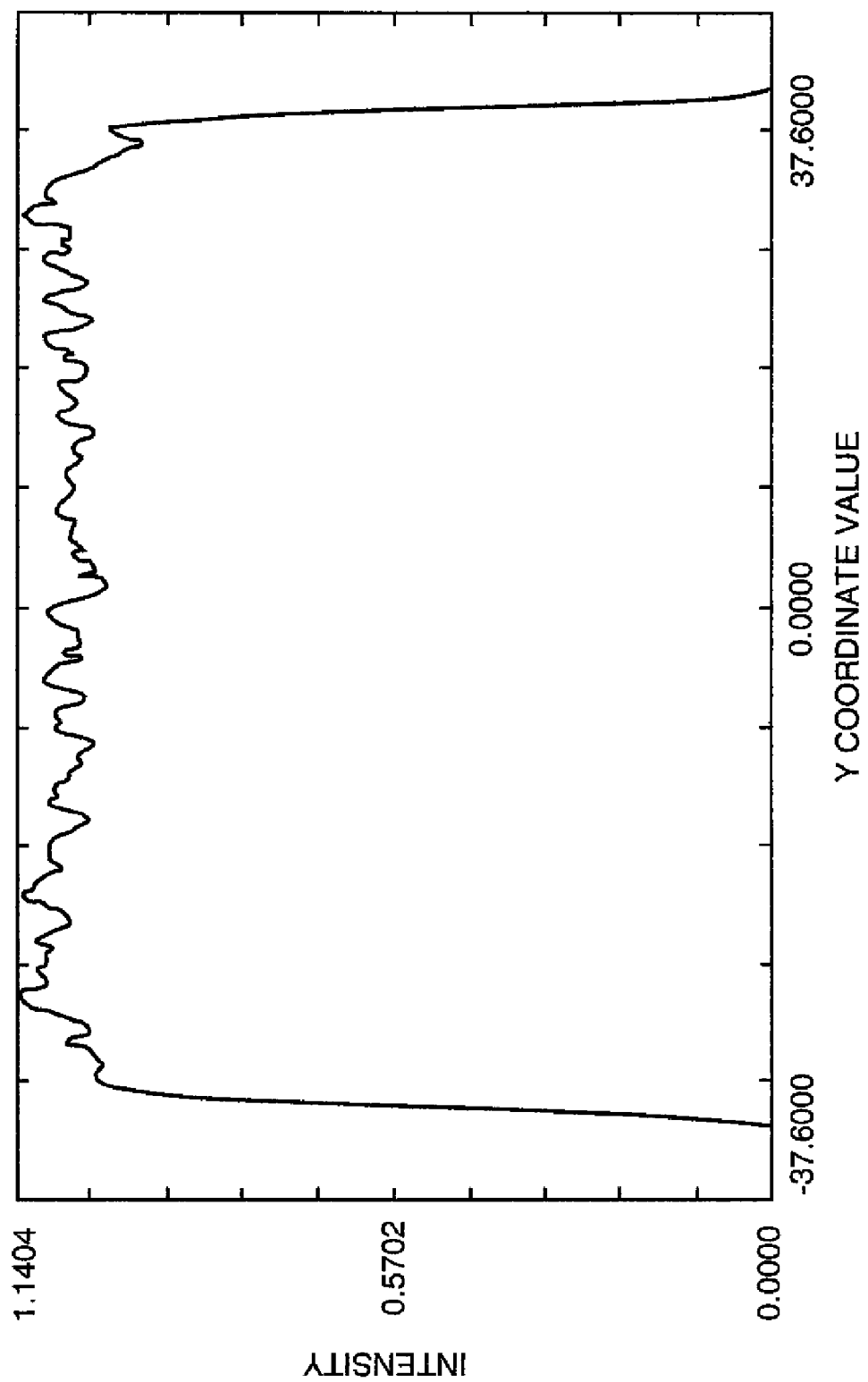
FIG. 7 is a graph showing light intensity over the length of the line of illumination that is formed.

FIG. 6 shows an enlarged view of components of doubly telecentric converter 40 for relaying the intermediate image of uniform linear illumination at I onto linear array light modulator 100 (FIG. 1A) in one embodiment. In doubly telecentric converter 40, a cylindrical lens element 38 spreads the uniformized beam from the propagation path in the length direction, providing zero magnification in the width direction. An aspheric cylindrical lens element 42 then provides further beam distribution, with improved light efficiency and uniformity along the length of linear illumination 50. Multi-beam line 34' is then directed through a first aspheric lens element 44, then through a second aspheric lens element 66 that provides essentially telecentric light at its output. The graph of FIG. 7 shows a plot of relative laser light intensity versus position along the line of linear illumination 50 versus light intensity in relative units of mm. This shows that the optical components of doubly telecentric converter 40 operate to provide an efficient and highly uniform light output along the length direction.

Zoom Components

As was noted with reference to FIG. 1A, cylindrical lens element 72 cooperates with optical assemblies 52 and 54 to provide cylindrical zoom lens apparatus Z in various embodiments of the present invention. The zoom lens optics effectively sharpen the focus in the width direction. When using laser array 22, two related zoom arrangements are provided within cylindrical zoom lens apparatus Z, one for light from linear beam array 60 (using the combination of optical assembly 54 and fixed-position lens element 72) and the other from linear beam array 62 (using the combination of optical assembly 52 and lens element 72). In embodiments using edge-emitting laser arrays where the optical path lengths for linear beam arrays 60 and 62 are equal, only a single optical assembly 52 is used as a zoom lens apparatus Z component.

The use of zoom lens apparatus Z proves advantageous because it allows some measure of adjustment in compensation for beam width variation between laser emitter arrays. It should be noted that adjustment provided by zoom lens capability may not be needed in an embodiment, depending on the laser arrays used. In such a case, cylindrical lenses for focus in the cross-array direction can be fixed in position.

Alternate Embodiments with Correction in the Optical Path

Figure 8:
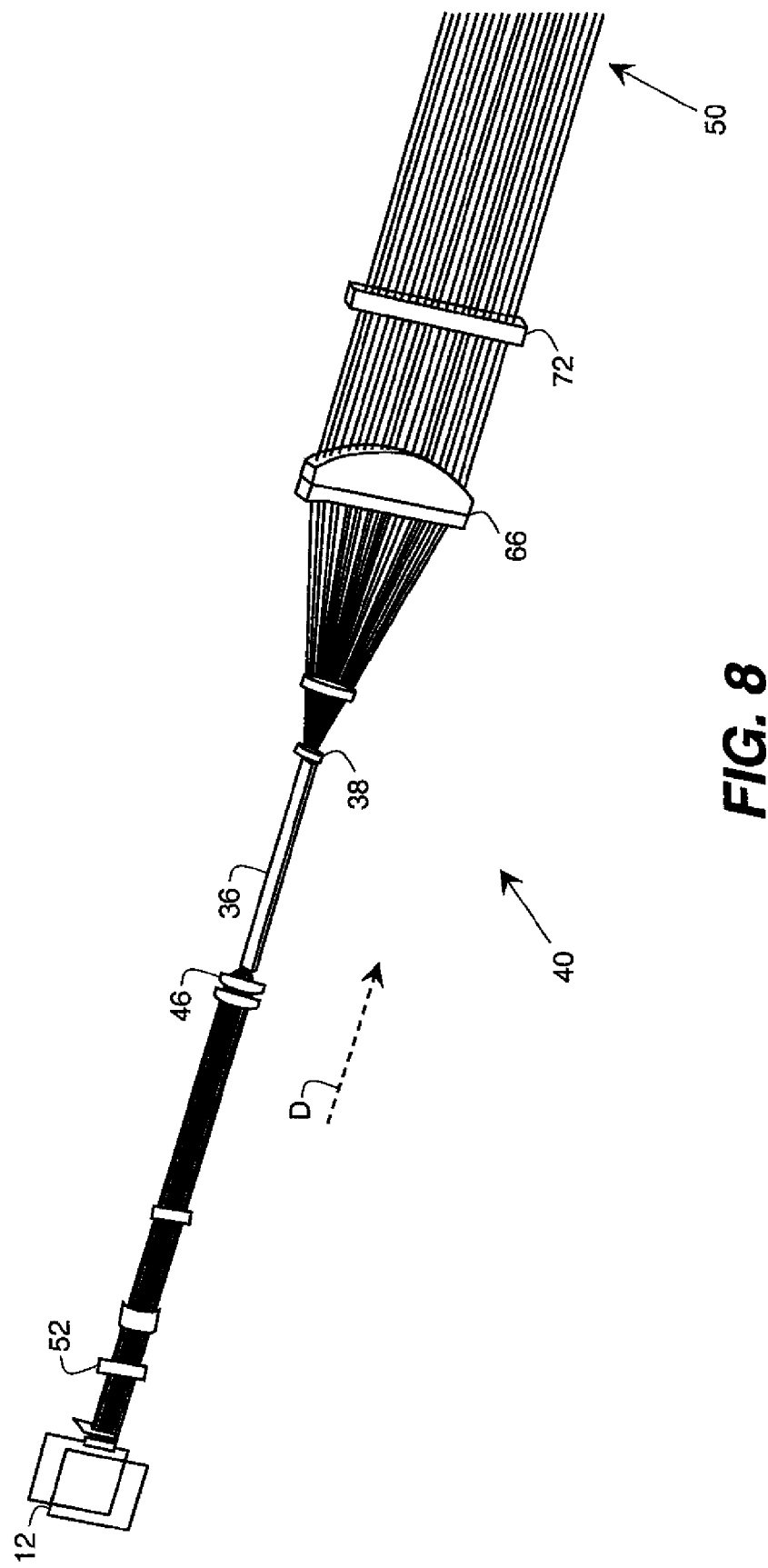
FIG. 8 is a perspective view that shows an illumination apparatus having additional corrective optics.

In a color display apparatus, three or more component colors are separately modulated, then their modulated light is combined to form the color image. Due to laser component availability and suitability, there can be embodiments in which two different color channels use two different types of laser arrays as light source 12. Referring to FIG. 8 for example, a red color channel uses two edge-emitting lasers and has the arrangement shown. Blue and green color channels have the arrangement previously shown in FIG. 5.

Figure 9:
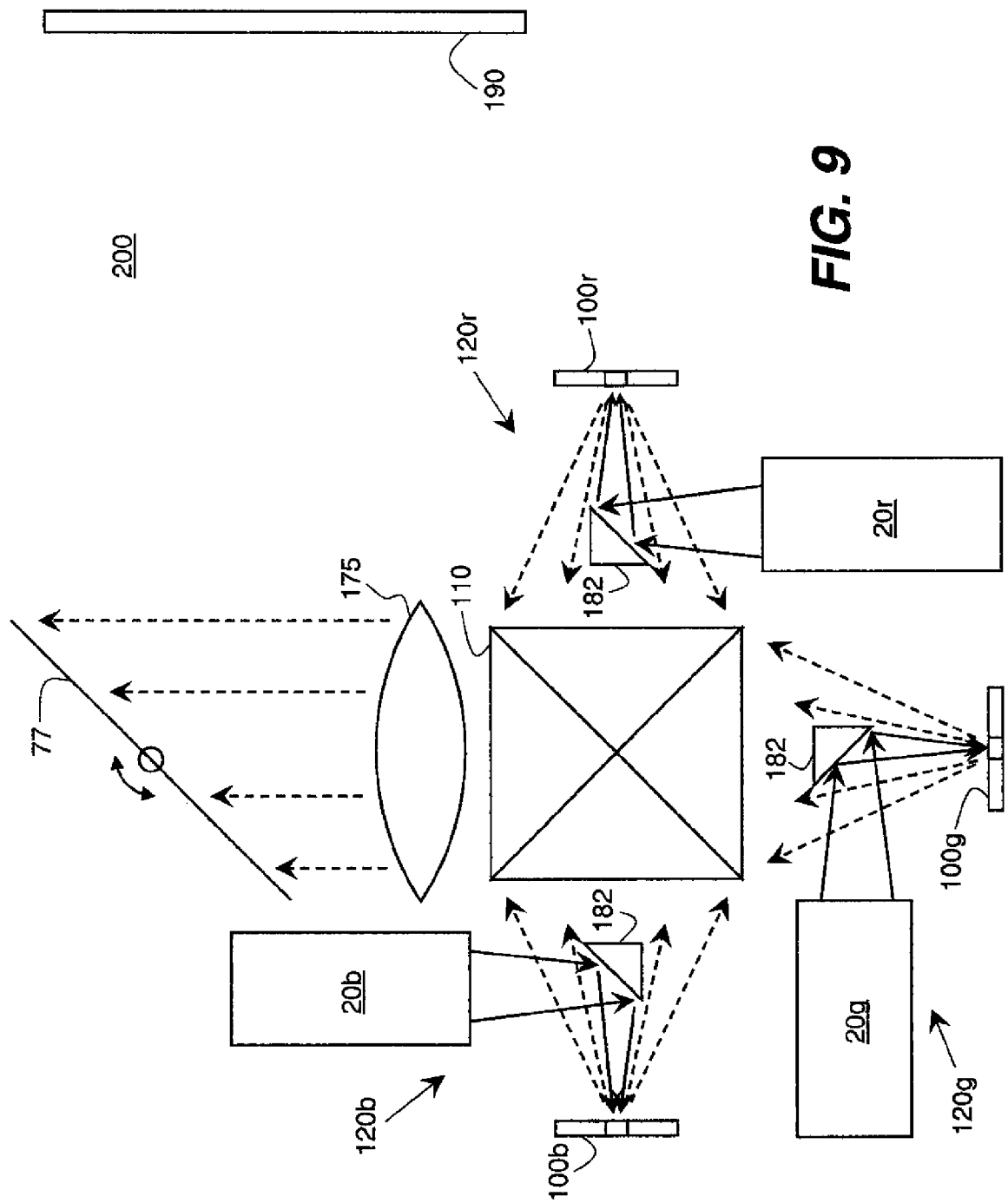
FIG. 9 is a schematic block diagram of a display apparatus using the illumination apparatus of the present invention.

The schematic block diagram of FIG. 9 shows a display apparatus 200 having three color channels 120r, 120g, and 120b. Each of the color channels 120r, 120g, and 120b has a corresponding red illumination apparatus 20r, green illumination apparatus 20g, or blue illumination apparatus 20b that utilizes linear array light modulators, correspondingly shown as 100r, 100g, and 100b. In each color channel, a turning mirror 182 redirects the line of illumination and blocks the zero order light while not obstructing the modulated light in higher orders. Color combiner 110 combines the modulated light from each color channel 120r, 120g, and 120b and directs the modulated light through a projection lens 175 and toward a rotating reflective element 77 that scans the modulated color light onto a display surface 190 to form a color image. One or more of illumination apparatus 20r, 20g, and 20b provide a uniform line of illumination using the line illumination apparatus of the present invention.

Figure 10:
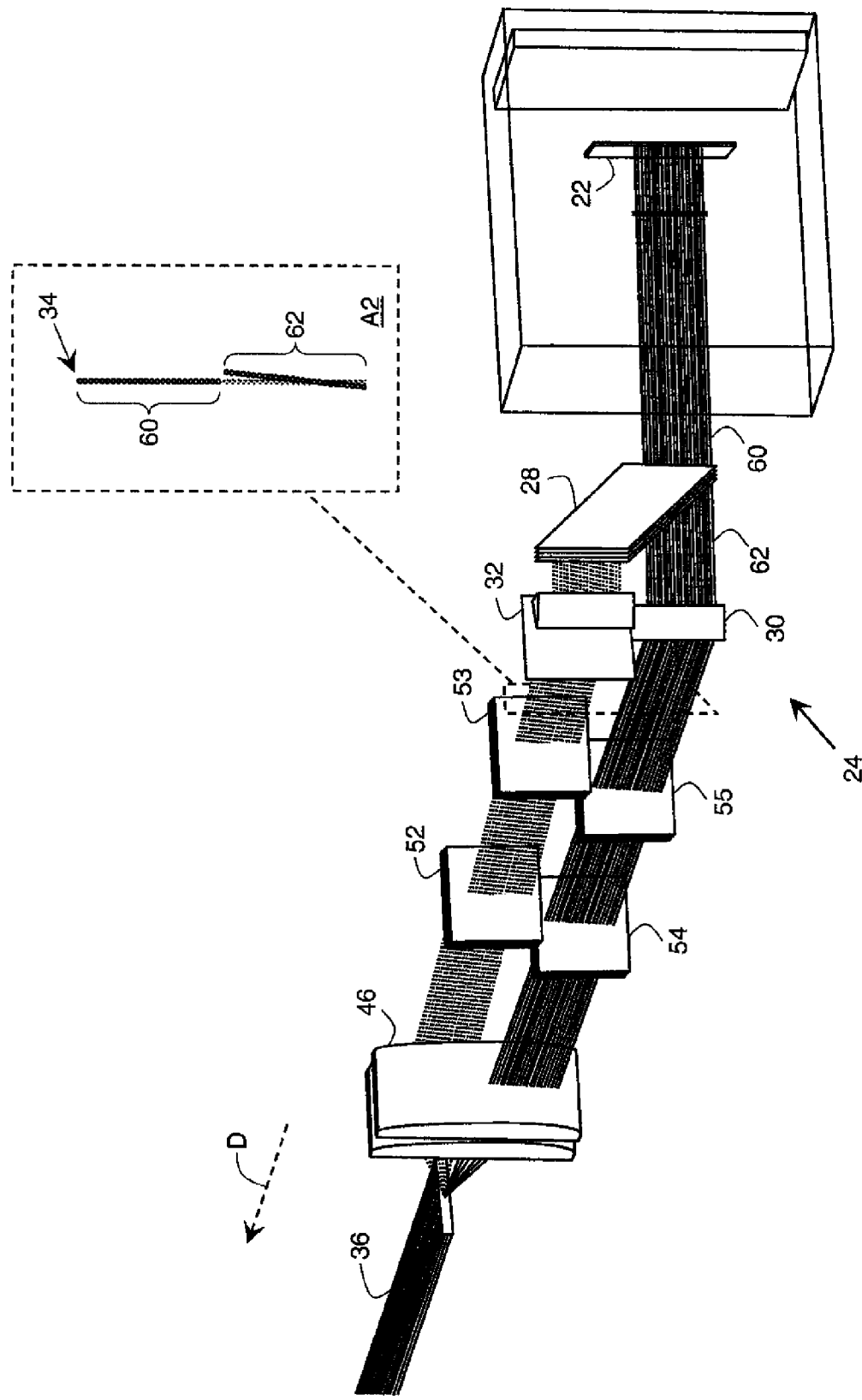
FIG. 10 is a perspective view of an illumination apparatus in an alternate embodiment that includes corrective optics for misalignment of laser beam arrays.

The perspective view of FIG. 10 shows an embodiment that allows correction for misalignment of linear beam arrays 60 and 62. A cylindrical lens element 55 is provided in the path of multi-beam line 34 to allow correction of linear beam array 62 misalignment. A corresponding cylindrical lens element 53 is provided in the path of multi-beam line 34 to allow correction of linear beam array 60 misalignment.

Alternate Embodiments Not Requiring an Integrator for Light Propagation

The embodiment described with reference to FIGS. 1A, 1B, 5, 6, and 8 work best when used with laser emitters having short coherence lengths, such as a few mm or less. With longer coherence lengths, some interference artifacts are possible. For example, with laser arrays having pairs of beams from the same emitter cavity, such as the NECSEL laser arrays previously described, a coherence length that is longer than the path difference for corresponding forward and backward emitters can cause interference as the individual laser beams propagate in the optical system. This can result in sinusoidal fringe artifacts in linear illumination 50 (FIG. 1A), causing banding in the image scanned from linear array light modulator 100. Even with calibration for correcting this banding, the resulting correction would lower overall optical efficiency. In addition, the relative instability of the resulting pattern, due to factors such as heat, mechanical precision, laser stability, and ageing, would likely cause some drifting of the illumination artifacts over time, making correction techniques difficult or impossible to employ effectively.

Even where the coherence lengths of individual emitters are short enough to satisfy the requirement relative to path difference, however, tinter difficulties can be encountered when using the FIG. 1A approach. Interference of each emitter with itself can occur as the light propagates within integrator 36, caused by varying propagation times and beam spread. The resulting artifacts can be characterized by sinusoidal fringes having a lower spatial frequency than those caused by interference of paired emitters as just described.

In practice, it has been found that currently available NECSEL laser arrays can prove unsatisfactory when using the embodiment of FIGS. 1A, 1B, 5, 6, and 8 with integrator 36 for light propagation, largely due to their longer coherence lengths. Thus, until laser arrays having suitably short coherence lengths become available, an alternative approach must be taken for providing a substantially uniform line of illumination.

Figure 11:
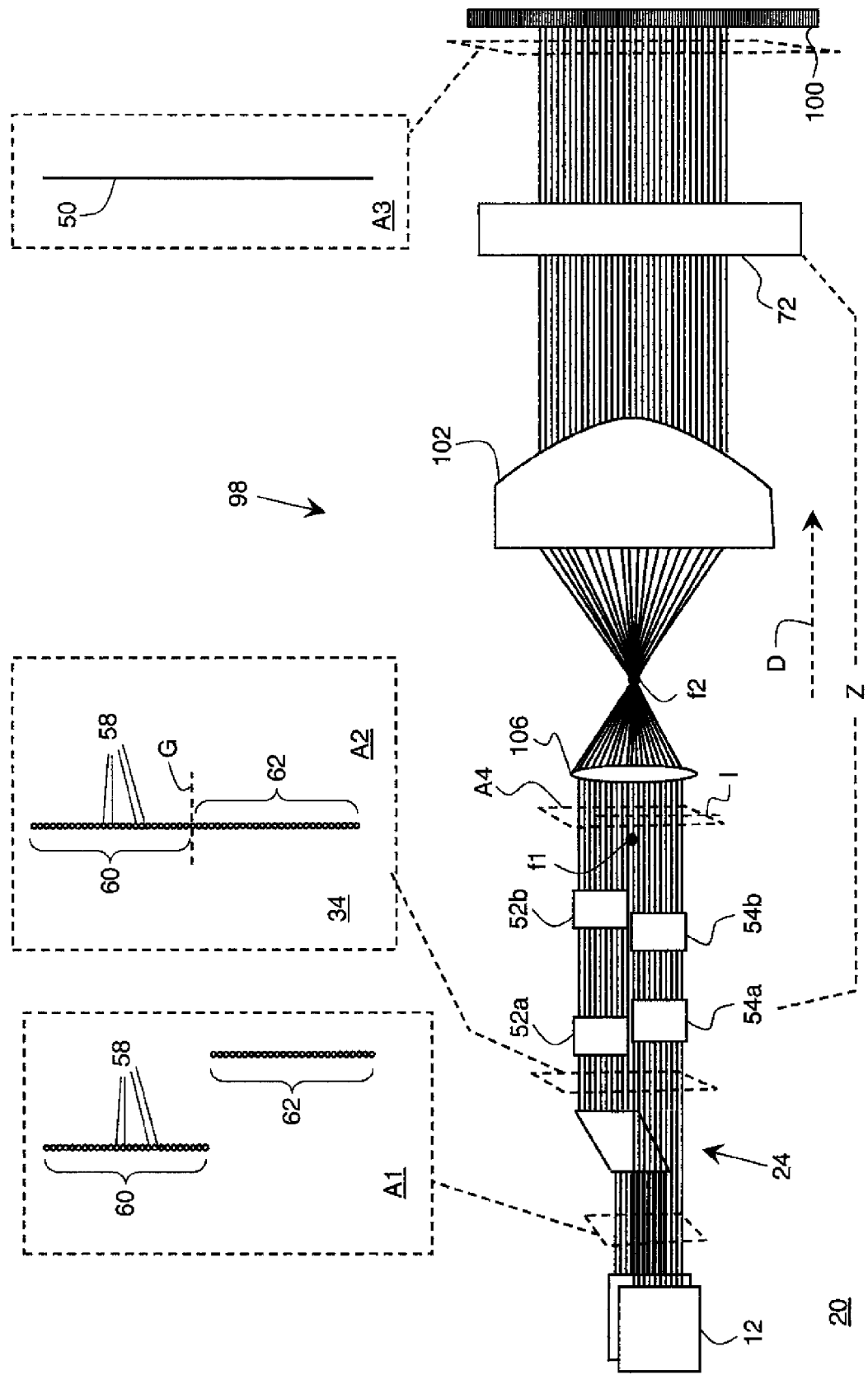
FIG. 11 is a schematic block diagram of an alternate embodiment of the present invention for forming a single line of illumination from a pair of laser arrays.

Referring to FIG. 11, there is shown an alternate embodiment suitable for laser arrays having longer coherence lengths than those suggested for the FIG. 1A embodiment. With this arrangement, interference between paired emitters from the same emitter cavity is not permitted and no integrator bar or other type of integrator is used along the light propagation path. Instead, light propagation in air is used as a more passive mechanism for mixing light from multiple emitters to form a mixed illumination while maintaining single-mode characteristics in the cross-array direction. Linear beam arrays 60 and 62 again each have a separate arrangement of zoom optics that share lens element 72. A zoom optics arrangement for linear beam array 62 is provided by lenses 54a and 54b and lens element 72. The other zoom optics arrangement for focusing linear beam array 60 is provided by lenses 52a and 52b and shared lens element 72. Lens element 106 and lens element 102 cooperate to form a doubly telecentric converter 98 for providing linear illumination 50. Lens element 106 and lens element 102 are each shown generalized as single lens elements in FIG. 11, but either or both are possibly formed of multiple lens elements, including at least one cylindrical lens element.

In the embodiment of FIG. 11, doubly telecentric converter 98 forms an image of plane A4, located within focal distance defined by focal point f1, and thus images intermediate image I, as linear illumination 50, onto linear array light modulator 100. Plane A4 can thus be considered to be an intermediate image plane for illumination in this system. Lens elements 106 and 102 form a (lengthwise) magnified image of intermediate image I at linear array light modulator 100; the magnification is given by the ratio of focal lengths of lens elements 102 and 106. By comparison with the embodiment shown in FIG. 1A, the magnification needed for forming linear illumination 50 from intermediate image I in the FIG. 11 embodiment is modest, for example, on the order of about 4×, compared with magnification on the order of about 50× or even higher where integrator 36 is used in the light propagation path. Unlike the embodiment of FIG. 1A, however, the FIG. 11 embodiment does not provide the complete "redundancy" or spread of each laser emitter along the light propagation path so that each individual laser contributes to the fill line of illumination 50 as was described earlier with reference to FIG. 2. However, because of this, no two mutually coherent laser emitters interfere as with the FIG. 1A embodiment.

Preventing matched pairs of lasers from interference, as can be achieved using the configuration shown in FIG. 11, has the beneficial effect of reducing artifacts. However, a drawback of this arrangement is that there can be an unwanted gap between linear beam array 60 and linear beam array 62, indicated as a gap G in FIG. 11. Gap G can occur whenever the spacing between linear beam array 60 and linear beam array 62 exceeds the spacing between individual laser emitters within each beam array. If gap G exists, there can be loss of brightness at the center of linear illumination 50.

Figure 12:
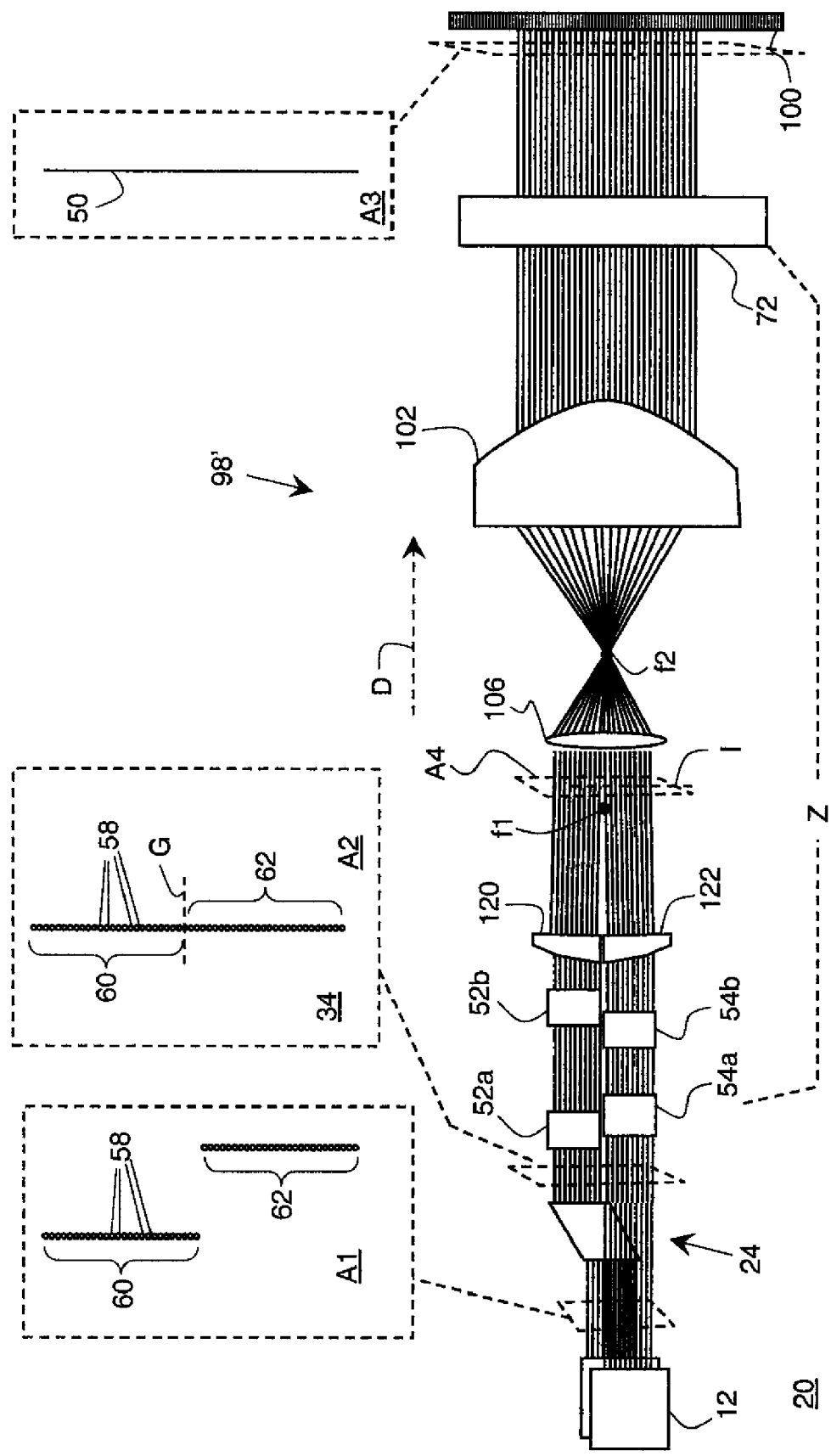
FIG. 12 is a schematic block diagram of another alternate embodiment of the present invention for forming a single line of illumination from a pair of laser arrays, with some amount of gap compensation.

The embodiment of FIG. 12 provides a measure of correction where there is a gap G distance. Cylindrical lens element 120 provides slight redirection of linear beam array 60. Similarly, cylindrical lens element 122 provides slight redirection of linear beam array 62 in order to form intermediate image I at intermediate image plane A4. This corrected intermediate illumination is then relayed and mixed to form linear illumination 50. In one embodiment, lens elements 120 and 122 are decentered cylindrical lenses which, in addition to adding some prismatic effect, also add some positive power along the array direction. In such a case, doubly telecentric converter 98' may need to be slightly non-a focal, so that it is only approximately telecentric for incoming light. Because only slight redirection of the light from linear beam arrays 60 and 62 is needed, decentered cylinder lens elements 120 and 122 could also each be replace with a weak prism or the combination 120 and 122 replaced with a single bi-prism.

Although lens element 106 in the FIGS. 11 and 12 embodiments are shown to be a positive cylindrical lens, this optical component could alternately be a negative cylinder lens and have a different position from that shown. In the case of a negative lens element 106, doubly telecentric converter 98 would resemble a Galilean telescope. Its object-space focal point would correspond to focus f2 in FIG. 11. The magnification provided would be based on the ratio of focal lengths of lens elements 102 and 106. As another alternative, positive lens element 106 could be formed using two or more lens elements of lesser power. In yet another embodiment, lens element 106 is formed by a combination of a positive and a negative lens element, maintaining the desired magnification and telecentricity.

Figure 13A:
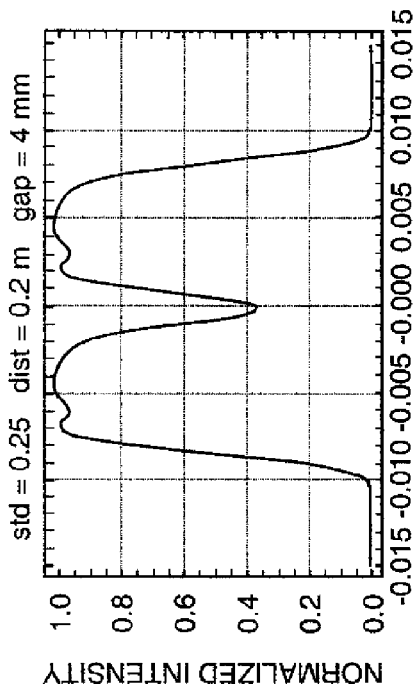
FIGS. 13A, 13B, 13C, and 13D show the effects of beam spreading for two linear beam arrays, measuring relative intensity of the beam at different distances from the light source.
Figure 13B:
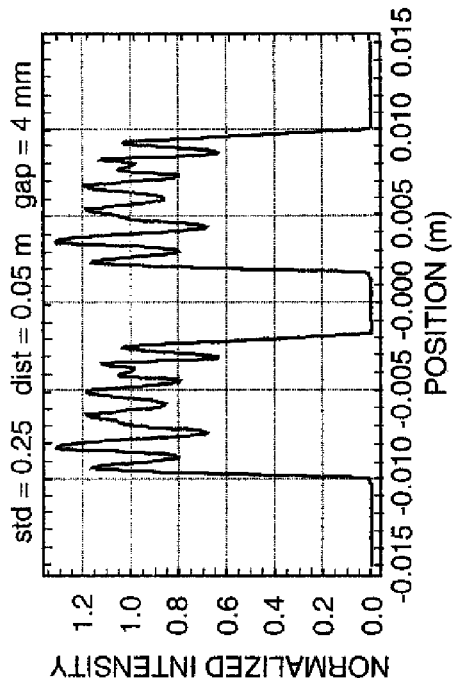
Figure 13C:
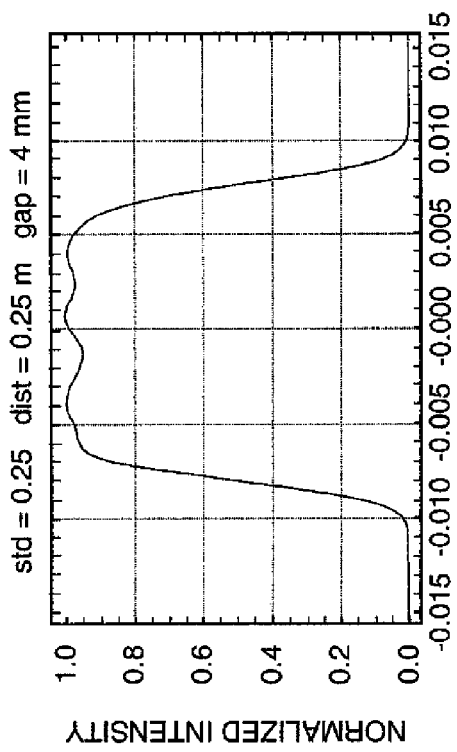
Figure 13D:
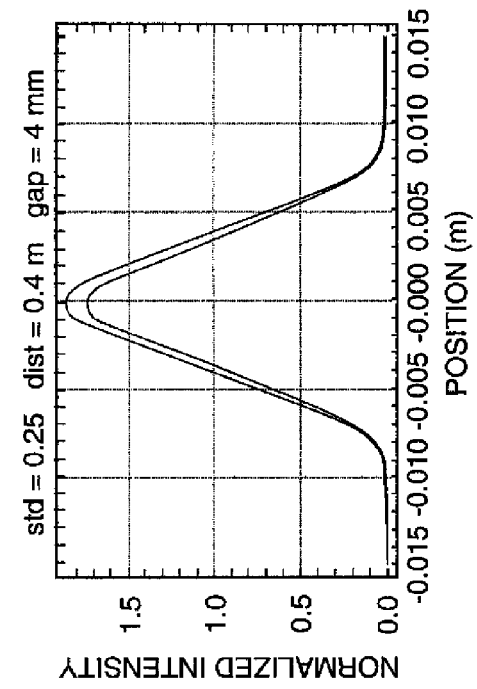

As noted earlier, the embodiments of FIGS. 11 and 12 eliminate the need for light propagation in integrator 36 by using light propagation in air for mixing. Using this method, the further each linear beam array 60 and 62 travels, the greater the amount of beam spreading. The graphs of FIGS. 13A, 13B, 13C, and 13D show the effects of beam spreading, modeling relative intensity of the beam at different distances from light source 12 and relative to the center of the line of illumination that is formed. FIG. 13A shows the intensity profile very close to the laser arrays. A gap is assumed in the model, between the two linear beam arrays. Individual emitters have been modeled to exhibit significant variation in intensity from each other, as has been observed experimentally, for the NECSEL arrays. FIG. 13B shows the improvement in the intensity profile from an increased distance, assuming a bi-prism is used to mitigate the gap between the two linear beam arrays. FIG. 13C shows good intensity uniformity at a fisher distance. The model assumes, as is the case for the NECSEL-type lasers, that there is a correspondence for each emitter in the two linear beam arrays, as can be seen in FIG. 13A. The model also assumes that the corresponding forward- and backward-directed emitters in each pair of linear beam arrays 60 and 62 are mutually coherent. FIG. 13D shows that at excessive distance, two problems arise, as observed, in practice, by the inventors. First, the shoulders of the intensity profile become soft, rolling off gradually and thus indicating an efficiency loss compared to the ideal flat and square-shouldered profile. Secondly, because each emitter in linear beam array 60 has a corresponding, mutually coherent emitter in linear beam array 62, undesirable sinusoidal fringing emerges in the intensity profile as light from these emitters begins to overlap.

Figure 14:
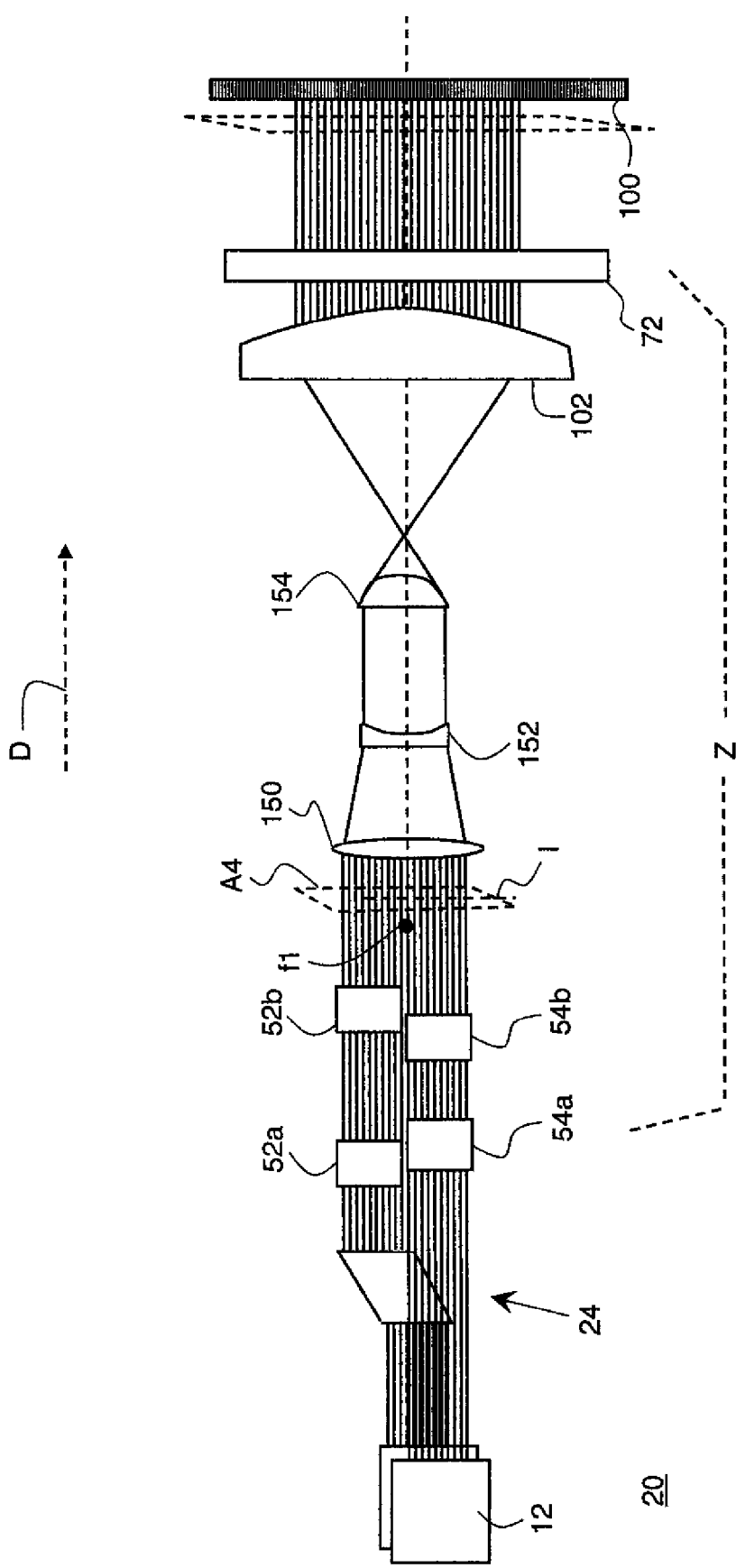
FIG. 14 is a block diagram showing an alternate embodiment of an illumination apparatus having a shorter optical system distance.

Recognizing that reducing the total optical path length, or track length, for the linear illumination approaches shown in FIGS. 11 and 12 is beneficial for overall system dimension and cost, the embodiment depicted in FIG. 14 teaches a solution for reduced track length of illumination apparatus 20. In this embodiment, lens elements 150 and 152 form a beam compressor that reduces the beam width from each emitter of linear beam arrays 60 and 62. The smaller beam widths then cause the diffractive beam-width growth on propagation to increase, thereby reducing the total propagation distance along propagation path D required to achieve a desired level of mixing of the emitters. A lens element 154 directs light along propagation path D to lens element 102. Mixing of the light primarily occurs between lens elements 152 and 154. As with the embodiments of FIGS. 11 and 12, the embodiment of FIG. 14 eliminates the need for integrator components in the light propagation path.

The embodiment described with reference to FIGS. 1A and 1B and embodiments described with reference to FIGS. 11, 12, and 14 have a similar arrangement of components, with an array combiner that aligns two separate linear beam arrays and directs them toward a propagation path for mixing, at least one pair of cylindrical lens elements providing power in the linear direction, and at least one other pair of cylindrical lens elements providing power for focus in the orthogonal, cross-array direction. Alternative embodiments may or may not use an integrator in the propagation path, decentered lenses for gap correction, and additional lens elements for narrowing the laser beams to improve mixing during propagation.

The apparatus of the present invention is advantaged over conventional approaches for forming a line of laser light, since two or more laser arrays can be combined for added power, without compromising line width, uniformity, and other criteria that have particular value with GEMS and GLV modulation. Where a GEMS or GLV modulator device are used to modulate light using illumination apparatus 20, the laser array itself is imaged onto the modulator.

The invention has been described in detail with particular reference to certain preferred embodiments thereof, but it will be understood that variations and modifications can be effected within the scope of the invention as described above and as noted in the appended claims by a person of ordinary skill in the art without departing from the scope of the invention. For example, the illumination apparatus of the present invention can be used with any of a number of different types of linear array light modulator in addition to GEMS and GLV devices as described herein. Alternate embodiments of the present invention can employ three or more arrays of lasers.

Thus, what is provided is an illumination apparatus that provides a highly uniform, thin line of light for illumination and other applications.

PARTS LIST 12 light source
20 illumination apparatus
20r red illumination apparatus
20g green illumination apparatus
20b blue illumination apparatus
22 laser array
24 combiner
26 reflective element
30 reflective element
32 reflective element
28 light guide
34 multi-beam line
34' multi-beam line
36 integrator
38 lens element
40 doubly telecentric converter
42 lens element
44 lens element
46 lens, condenser
50 linear illumination
52 optical assembly
52a lens
52b lens
53 lens
54 optical assembly
54a lens
54b lens
55 lens
58 beam
60 linear beam array
62 linear beam array
66 aspheric lens element
72 lens element
77 reflective element
80 patterned mirror
82 transmissive segment
84 reflective segment
88 turning mirror
90 laser array
92 laser array
94 retarder
96 polarization beam splitter
98 doubly telecentric converter
98' doubly telecentric converter
100 linear array light modulator
100r linear array light modulator
100g linear array light modulator
100b linear array light modulator
102 lens element
104 intensity profile distribution graph
106 lens element
110 color combiner
120 lens element
120r color channel
120g color channel
120b color channel
122 lens element
150 lens element
152 lens element
154 lens element
175 lens
182 turning mirror
190 display surface
200 display apparatus
A1 view
A2 view
A3 view
A4 intermediate image plane
D propagation path
f1 focal point
f2 focal point
G gap
I intermediate image
P polarization state
S polarization state
Z zoom lens apparatus

The invention claimed is:

1. An illumination apparatus for forming, onto a linear array light modulator, a line of illumination that extends in a linear direction, the illumination apparatus comprising:

a) a first laser array comprising a plurality of laser emitters for forming a first linear beam array and, spaced apart from the first laser array, a second laser array in a plane parallel to a plane of the first laser array comprising a plurality of laser emitters for forming a second linear beam array;

b) an array combiner disposed to align at least the first linear beam array and the second linear beam array into a single multi-beam line in the linear direction and to direct the first and second linear beam arrays along a propagation path;

c) at least first and second cylindrical lens elements having power in the linear direction and disposed to relay the single multi-beam line illumination from the propagation path toward the linear array light modulator; and d) at least third and fourth cylindrical lens elements having power in the cross-array direction that is orthogonal to the linear direction and disposed to focus the single multi-beam line illumination onto the linear array light modulator.

2. The illumination apparatus of claim 1 wherein the array combiner comprises a light guide.

3. The illumination apparatus of claim 1 wherein the array combiner comprises a patterned mirror.

4. The illumination apparatus of claim 1 wherein the array combiner comprises a polarization beam splitter.

5. The illumination apparatus of claim 2 wherein the light guide is a prism having an incident face in the path of the one or more laser beams of the second laser array.

6. The illumination apparatus of claim 1 wherein the at least first and second cylindrical lens elements form a doubly telecentric converter having power in the linear direction.

7. The illumination apparatus of claim 1 further comprising an integrator for mixing light in the propagation path.

8. The illumination apparatus of claim 7 wherein the integrator comprises a glass plate.

9. The illumination apparatus of claim 1 further comprising at least a fifth cylindrical lens element having power in the cross-array direction and disposed between the array combiner and the first cylindrical lens element and cooperating with the third and fourth cylindrical lens elements to form a zoom lens for the line of illumination in the cross-array direction.

10. The illumination apparatus of claim 1 further comprising an aspheric lens element for providing uniform, telecentric illumination along the linear direction.

11. The illumination apparatus of claim 1 further comprising at least one decentered cylindrical lens element disposed to redirect light from the first linear beam array toward the first cylindrical lens element.

12. The illumination apparatus of claim 1 wherein the linear array light modulator is an array of micro-electromechanical devices.

13. An illumination apparatus for forming, onto a linear array light modulator, a line of illumination that extends in a linear direction, the illumination apparatus comprising:

a) a first laser array comprising a plurality of laser emitters for forming a first linear beam array and a second laser array, spaced apart from the first laser array in a plane parallel to a plane of the first laser array and comprising a plurality of laser emitters for forming a second linear beam array;

b) an array combiner disposed to align at least the first linear beam array and the second linear beam array into a single multi-beam line in the linear direction and to direct the first and second linear beam arrays along a propagation path; c) at least first and second cylindrical lens elements having power in the linear direction and disposed to relay the single multi-beam line illumination from the propagation path toward the linear array light modulator; and d) at least a first zoom lens in the path of the first linear beam array and comprising third, fourth, and fifth cylindrical lens elements having power in the cross-array direction that is orthogonal to the linear direction, wherein at least the third lens element is disposed between the array combiner and the first cylindrical lens element and cooperates with the fourth and fifth cylindrical lens elements to focus the single multi-beam line illumination onto the linear array light modulator in the cross-array direction.

14. The illumination apparatus of claim 13 further comprising an integrator for mixing light in the propagation path.

15. The illumination apparatus of claim 13 wherein the at least first and second cylindrical lens elements form a doubly telecentric converter having power in the linear direction.

16. A display apparatus comprising:

a plurality of color channels, each color channel comprising:

(i) a linear array light modulator;

(ii) an illumination apparatus for forming, onto the linear array light modulator, a line of illumination that extends in a linear direction, the illumination apparatus comprising:

a first laser array comprising a plurality of laser emitters for forming a first linear beam array and, spaced apart from the first laser array, a second laser array comprising a plurality of laser emitters for forming a second linear beam array in a plane parallel to a plane of the first laser array;

an array combiner disposed to align at least the first linear beam array and the second linear beam array into a single multi-beam line in the linear direction and to direct the first and second linear beam arrays along a propagation path to form a single multi-beam line illumination;

at least first and second cylindrical lens elements having power in the linear direction and disposed to relay the mixed illumination from the propagation path toward the linear array light modulator; and at least third and fourth cylindrical lens elements having power in the cross-array direction that is orthogonal to the linear direction and disposed to focus the single multi-beam line illumination onto the linear array light modulator;

(iii) a turning mirror disposed to redirect the line of illumination from the illumination apparatus onto the linear array light modulator and to block zero order light from the linear array light modulator and to pass higher order modulated light to a color combiner; and the color combiner disposed to combine the modulated light from each of the plurality of color channels and to direct the combined modulated light through a projection lens and toward a scanning element for scanning onto a display surface.

* * * * *